United States Patent
Bologna et al.

(10) Patent No.: US 7,079,576 B2
(45) Date of Patent: Jul. 18, 2006

(54) JOINT ZERO-FORCING AND MATCHED-FILTER ADAPTIVE DIGITAL EQUALIZER

(76) Inventors: Frank Patrick Bologna, P.O. Box 80525, San Diego, CA (US) 92138-0525; Fredric Joel Harris, P.O. Box 489, Lemon Grove, CA (US) 91946

( * ) Notice: Subject to any disclaimer, the term of this patent is extended or adjusted under 35 U.S.C. 154(b) by 970 days.

(21) Appl. No.: 09/905,722

(22) Filed: May 24, 2001

(65) Prior Publication Data
US 2003/0081670 A1 May 1, 2003

(51) Int. Cl.
*H03H 7/30* (2006.01)
*H04B 1/10* (2006.01)

(52) U.S. Cl. .................................................. 375/234
(58) Field of Classification Search ............... 375/229, 375/230, 232, 234, 285, 316, 340, 346
See application file for complete search history.

(56) References Cited

U.S. PATENT DOCUMENTS 6,600,794 B1 * 7/2003 Agarossi et al. ............ 375/341
6,760,363 B1 * 7/2004 Bettaieb ...................... 375/150

* cited by examiner

*Primary Examiner*—Kevin Kim
(74) *Attorney, Agent, or Firm*—Robert A. Brown

(57) ABSTRACT

A fractional-spaced equalizer (FSE) is capable of performing joint intersymbol-interference (ISI) cancellation and matched filter (MF) processing. The FSE employs a constrained optimization technique to control the out-of-band frequency response of the equalizer's FIR while, at the same time, controlling the pass-band and roll-off of the FIR to cancel ISI. The format of the constrained optimization technique permits a single bank of multipliers elements to service the inner product computations associated both with the ISI cancellation and MF operations. This time-multiplexing technique promotes a conservation of hardware associated with the MF, and provides for a reduction in the computational complexity leading to an increase in power efficiency.

101 Claims, 14 Drawing Sheets

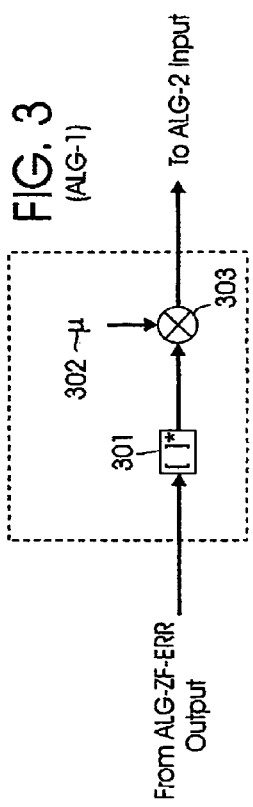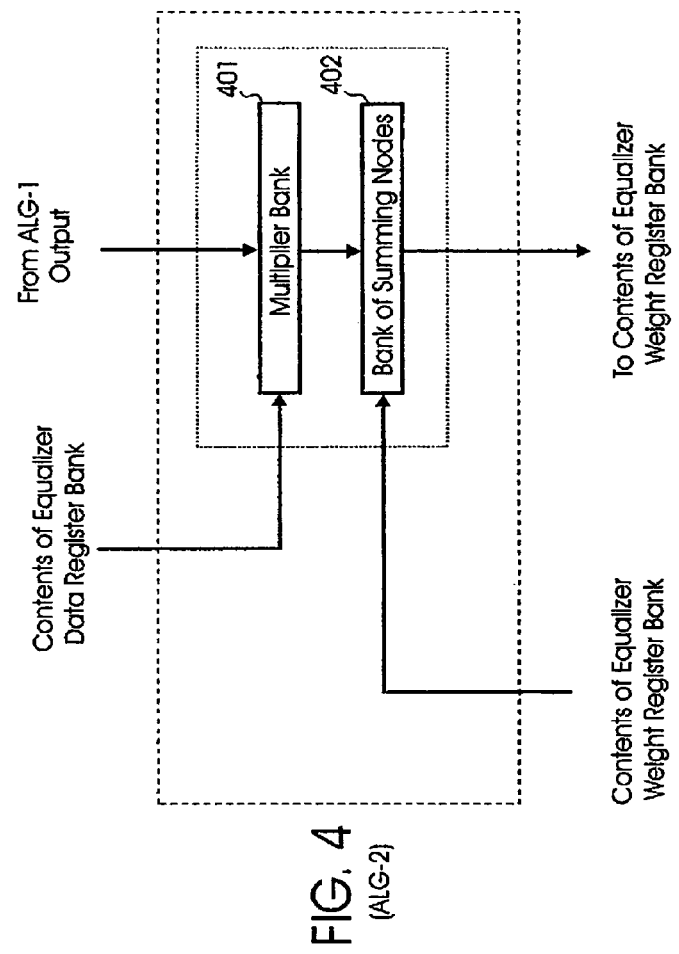

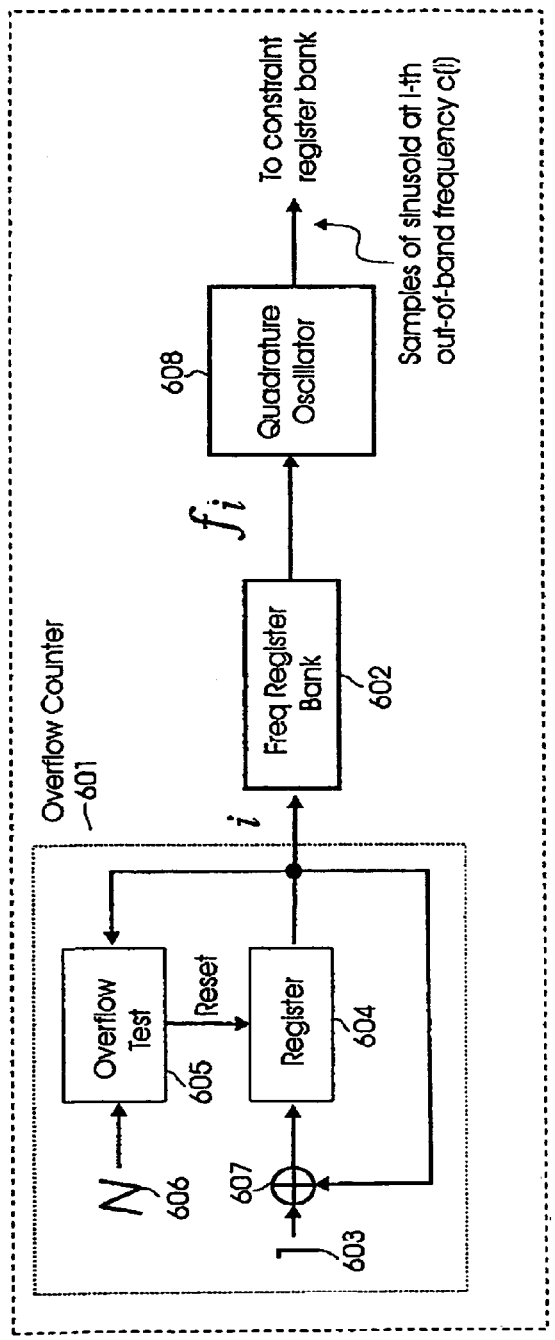
FIG. 6 (ALG-3)
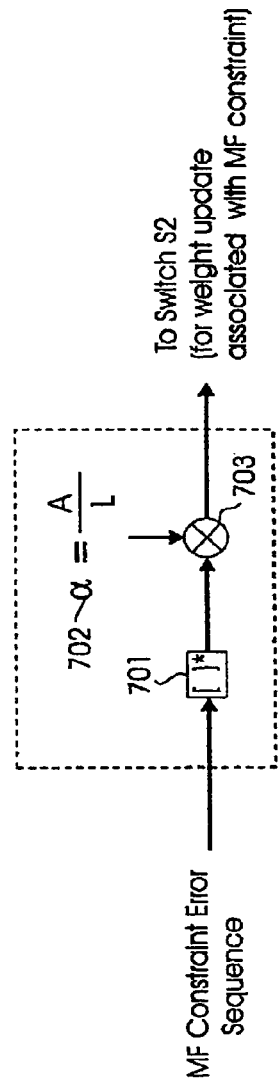
FIG. 7 (ALG-5)

(ALG-6)

(ALG-ZF-ERR Blind CMA Emb.)

{ALG-7}

{ALG-7 - Decision-Feedback Emb.}

(ALG-4 - *Multi-Window Emb.*)

(ALG-7)

(Polyphase Partitioned Emb.)

JOINT ZERO-FORCING AND MATCHED-FILTER ADAPTIVE DIGITAL EQUALIZER

TECHNICAL FIELD OF THE INVENTION

This invention relates to digital equalizer technology and more particularly to fractional-spaced equalizers that are preceded by a MF.

BACKGROUND OF THE INVENTION

In terms of suppressing out-of-band distortion and canceling multi-path ISI, the standard design of most digital receivers cascades a MF with an adaptive equalizer. The MF usually takes the form of a square-root raised cosine (RRC) response in order to maximize SNR while the adaptive equalizer often operates as a fractional-spaced equalizer (FSE) to allow inverse modeling of the propagation channel across the full spectral band, as apposed to only at pass-band frequencies in the symbol-spaced equalizer.

In modern receivers the transmitter's pulse-shaping process re-proportions the spectral energy of the base-band signal such that the major spectral components occupy the low-frequency band while the minor spectral lobes are made to occupy the high frequency band. The band-limited representation of the transmitted signal infers that channel inversion at out-of-band frequencies is only as important to restoring full-received SNR as to the extent that the signal's high frequency spectral components are important to representing the distortion-less transmitted modulation.

In terms of suppressing such out-of-band distortion signals as CW jamming the FSE has historically relied upon both the recursion of its ISI-canceling operation and on the out-of-band attenuation characteristics of the MF preceding it. If the source of the distortion is thermal noise, however, the FSE must rely exclusively on the MF as the equalizer's spectral side-lobe levels are not well defined, are susceptible to variations in the adaptation constant, and therefore, cannot suppress the noise prior to decimation of the signal to the symbol rate.

With the importance of multi-path ISI cancellation relatively unimportant at out-of-band frequencies and with the pre-FSE RRC MF providing suppression of out-of-band interference, the responsibilities of the FSE's out-of-band mask have remained limited to the cancellation of excess adjacent channel interference not suppressed by the MF. It is noted that both the pre-FSE RRC MF and FSE are digital filters that operate at the same sample rate and whose responsibilities across the frequency band are approximately decoupled. Because of this, both filters can be combined into a single filter if control over the FSE's spectral mask can sustain well-defined side-lobes that are immune to changes in the equalizer's adaptation constant.

This suggests a single filter implementation for the cascade design. From the point of hardware, a cascading of successive digital filters demands that separate bank of FPGA multipliers must be used to service the demands of each filter in the cascade chain. A single filter implementation of the traditional RRC MF plus FSE cascade design reduces cost as similar hardware components can be used to service the processing of associated with each. Although an increase in computational complexity must result when two separate processes are combined to conserve hardware, many options present themselves to minimize this increase. Consequently, reductions in both computational complexity and power consumption over that required for the traditional cascade design are possible.

Accordingly, it is one objective of the present invention to provide a FSE that can simultaneously affect control over the equalizer's pass-band, roll-off, and side-lobe characteristics using a technique of constrained optimization so as to form a joint ISI-cancelling and MF update that can achieve the received SNR performance of the state-of-the-art cascade pre-FSE RRC MF plus FSE design.

It is another object of the present invention to provide a FSE that implements a time-multiplexing architecture that enables a single bank of multiplier elements to perform the inner product computations associated with both the ISI-canceling and MF updates within the confines of a constrained optimization update, the purpose to provide for reduced hardware complexity over that of the state-of-the-art cascade pre-FSE RRC MF plus FSE design.

It is the further object of the present invention to provide a FSE that operates as a joint ISI-canceling and MF FSE where the error associated with ISI-cancellation may be derived from any number of existing algorithms within the confines of the constrained optimization update of the present invention.

It is the further object of the present invention to interject the process of time-domain windowing of the constraint waveform into the constrained optimization update so as to minimize the increase in computational complexity incurred from the introduction of the time-multiplexing architecture.

It is the further object of the present invention to provide a FSE operating as a joint ISI-canceling and MF FSE where the rate at which the equalizer's weights are updated in accordance with the MF processing is controlled via an algorithm to minimize computational workload.

It is the further object of the present invention to provide a FSE operating as a joint ISI-canceling and MF adaptive equalizer which implements an initialization of the equalizer's FF weights using a selected set of coefficients of an RRC MF, the intent of which is to reduce the acquisition time of the MF characteristics of the FSE's steady-state joint inverse channel and MF function.

It is the further object of the present invention to provide a FSE operating as a joint and MF FSE under a constrained optimization update when the FSE is partitioned as a polyphase process.

SUMMARY OF THE INVENTION

These and other problems have been solved by combining the pre-FSE RRC MF and the FSE into a single filter joint process FSE that controls the spectral side-lobe behavior of the equalizer while simultaneously maintaining control over the equalizer's spectral pass-band and roll-off characteristics in accordance with the criterion for cancellation of ISI.

To accomplish this, the gradient descent algorithm of the standard unconstrained FSE, which is responsible for driving the ISI-cancellation process, was modified to incorporate a constraint via the Lagrange multiplier technique. The constraint is defined to be a restriction that the equalizer's weights be orthogonal to a waveform whose major spectral components reside at out-of-band frequencies. If the FSE is operated as a base-band equalizer then out-of-band refers to the high frequency band, and if FSE is operated as a band-pass equalizer, out-of-band refers to that portion of the frequency band not occupied by the signal's major spectral components.

To generate the orthogonality between the equalizer's weights and the out-of-band signal the inner product of these two time sequences is computed and subtracted from a desired orthogonality target on an iteration-by-iteration basis. The difference is scaled and then used to update the equalizer's weights in a direction so as to minimize the error. The orthogonality target is a scalar β of value less than 1.0 which forces the recursion of the constraint update to generate a low-pass process of the FSE at out-of-band frequencies. As a result, the spectral side-lobe development of the FSE is controlled so as to generate a low-pass process. The error between the measured orthogonality and targeted orthogonality is termed the constraint error and the high frequency signal is termed the constraint waveform.

Thus, the modified FSE updates the equalizer's weights twice per equalizer iteration—once in accordance with the minimization of the mean-squared error associated with ISI cancellation and the second time in accordance with the criterion for the added constraint. The modified equalizer is termed the joint ISI-canceling and MF adaptive equalizer, and because of the development of well-defined spectral side-lobes at steady-state, this joint process equalizer provides for robust RRC MF processing as well as simultaneous channel inversion.

The primary technical advantage of the present invention is that from the configuration of the linearly constrained algorithm driving joint process equalizer a time-multiplexing architecture is employed to allow a single bank of multiplier elements to service two inner product computations, that associated with the ISI cancellation and that associated with the added constraint for the MF processing. A single bank of multipliers servicing the needs of both ISI cancellation and MF processing contrasts with the two separate banks of multipliers required in the traditional cascade design, and therefore, the present invention conserves hardware in the system design.

The present invention pertains to the creation of a joint ISI-canceling and MF process for any FSE that is sampled at more than 1-sample-per-symbol and satisfies the Nyquist criterion. Although a FSE that is sampled exactly at the Nyquist rate can sufficiently perform full band channel inversion, FSEs are often sampled above the Nyquist rate at 2-samples-per-symbol (or twice the transmitted symbol rate) in order to simplify the subsequent task of down-sampling to the symbol rate. Hence, a preferred embodiment of the present invention is designed to operate the constrained FSE at twice the symbol rate. In this case, the decimation device at the output of the equalizer takes the form of a 2:1 commutator.

The time-multiplexing structure of the present invention remains unchanged regardless of the choice of the preferred embodiment for the FSE's sampling rate. For example, the constrained joint ISI-canceling and MF FSE operating at 2-samples-per-symbol performs a time-share of a single bank of multiplier elements with the samples of the two sequences accessing the multiplier bank, either the input data and the equalizer's weights or the equalizer's weights and the constraint waveform, separated in time at half-intervals of the transmitted symbol rate, or $T_{sym}/2$. In an alternate embodiment, the joint ISI-canceling and MF FSE can be sampled at less than 2-samples-per-symbol if the Nyquist criterion is satisfied. Here, the time-multiplexing scheme is still based upon a time-share of a single bank of multiplier elements, but now with the samples of the two sequences accessing the multiplier bank separated in time at fractional intervals less than $T_{sym}/2$. Thus, although the number of multiplier elements contained within the single bank increases as the FSE is sampled at larger rates, the time-multiplexing architecture of the present invention still provides for a conservation of hardware.

As previously mentioned, the constrained update of the present invention works in conjunction with an update responsible for inversion of the propagation channel. Amongst the various existing configurations for the algorithm that generates the error associated with channel inversion the constrained update of present invention is generally used with, but is not exclusive to, three different channel inversion updates: a training sequence update, a decision-based update, and a statistically based update. Used in conjunction with the newly formed linearly constrained algorithm, these three updates, as well as others not mentioned here, form embodiments of the present invention.

In the training sequence embodiment the error associated with ISI-cancellation is formed from the difference between the equalized signal and a known training sequence. In an alternate embodiment, a decision device, or slicer, forms the error as the difference between the equalized signal and the slicer's output, which is a quantized version of equalized signal. A third embodiment of the present invention forms this error as the scaled difference between the power of the equalized signal and a parameter describing the statistical properties of the original transmitted modulated signal.

A decision-directed configuration for the channel inversion error algorithm is often used in conjunction with a decision-feedback update for robust cancellation of ISI. Hence, a preferred embodiment of the present invention uses the joint ISI-canceling and MF linearly constrained update within the configuration of a decision-feedback equalizer.

Another technical advantage of the present invention is that the joint ISI-canceling and MF constrained update can be applied to a FSE that is partitioned as a poly-phase process. The polyphase decomposition of the standard FSE embeds the M:1 decimator normally occurring at the output of the equalizer to within the FSE using the Nobel Identity. As a result, the multiplier bank is partitioned into M multiplier sub-banks, each containing half the total multipliers of the non-partitioned multiplier bank. Although the workload per-output-point of the poly-phase partitioned FSE is greater than that of the non-poly-phase partitioned FSE by a factor of M, the poly-phase configuration commutates every M-th input sample of the distorted waveform to only one of the M sub-banks. Thus, the situation in the non-poly-phase FSE in which every input sample is processed by every equalizer weight is avoided in the poly-phase configured FSE. With regard to the present invention the linearly constrained poly-phase FSE is designed to form a joint ISI-canceling and MF process by computing M additional inner products associated with the constraint update. In the preferred embodiment of the present invention where M=2 the joint ISI-canceling and MF poly-phase FSE is able to conserve the hardware associated with the RRC MF's multiplier elements at the expense of four times the workload of the standard non-poly-phase configured unconstrained FSE.

A further technical advantage of the present invention is that when the constraint waveform is defined as a frequency dependent sinusoid residing in the high frequency band, the linearly constrained update may be modified to determine the most minimal duty cycle of the sinusoid required to saturate performance. In this embodiment the time-series of the high frequency sinusoidal signal is time-domain windowed with a digital window function so as to render the samples farthest from the midpoint of the total duty cycle with negligible importance as compared to the most central samples. The net effect is that the samples of negligible amplitude need not contribute in the inner product computation associated with the constraint update. This reduces the computational complexity and improves power efficiency.

It has been determined that the constraint, windowed or not windowed, need not contribute an update of the equalizer's weights at all iterations. Thus, the joint process equalizer may be designed with a switch to control at which iterations an update of the equalizer's weights associated with the MF processing is to occur. This also results in a reduction in the number of computations and the operational power needed to run the joint process equalizer.

Since the equalizer's impulse response at steady-state is to be a composite of both the inverse channel model and RRC MF, initialization of the equalizer with the RRC MF taps attains half the final solution from the start. Hence, initialization reduces acquisition time of the MF characteristics, which allows the MF processing to be partially eliminated sooner in the update.

The foregoing has outlined rather broadly the features and technical advantages of the present invention in order that the detailed description of the joint ISI-canceling and MF adaptive equalizer that follows may be better understood. Additional features and advantages of this joint process equalizer will be described hereinafter which form the subject of the claims of the invention. It should be appreciated by those skilled in the art that conception and the specific embodiment disclosed may be readily utilized as a basis for modifying or designing other structures for carrying out the same purpose of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 is a detailed block diagram of a preferred embodiment of the algorithm responsible for adjusting the error associated with channel inversion of the state-of-the-art MF plus FSE cascade system;

FIG. 4 is a detailed block diagram of a preferred embodiment of the weight update algorithm of the state-of-the-art MF plus FSE cascade system;

FIG. 6 is a detailed block diagram of the algorithm that generates samples of the constraint waveform in accordance with a preferred embodiment of the present invention;

FIG. 7 is a detailed block diagram of the constraint error adjustment algorithm in accordance with a preferred embodiment of the present invention;

DETAILED DESCRIPTION OF THE PRIOR ART

Before discussing the joint ISI-canceling and MF adaptive digital equalizer, it will be useful to discuss the state-of-the-art equalizer and MF cascade design.

Figure 1:
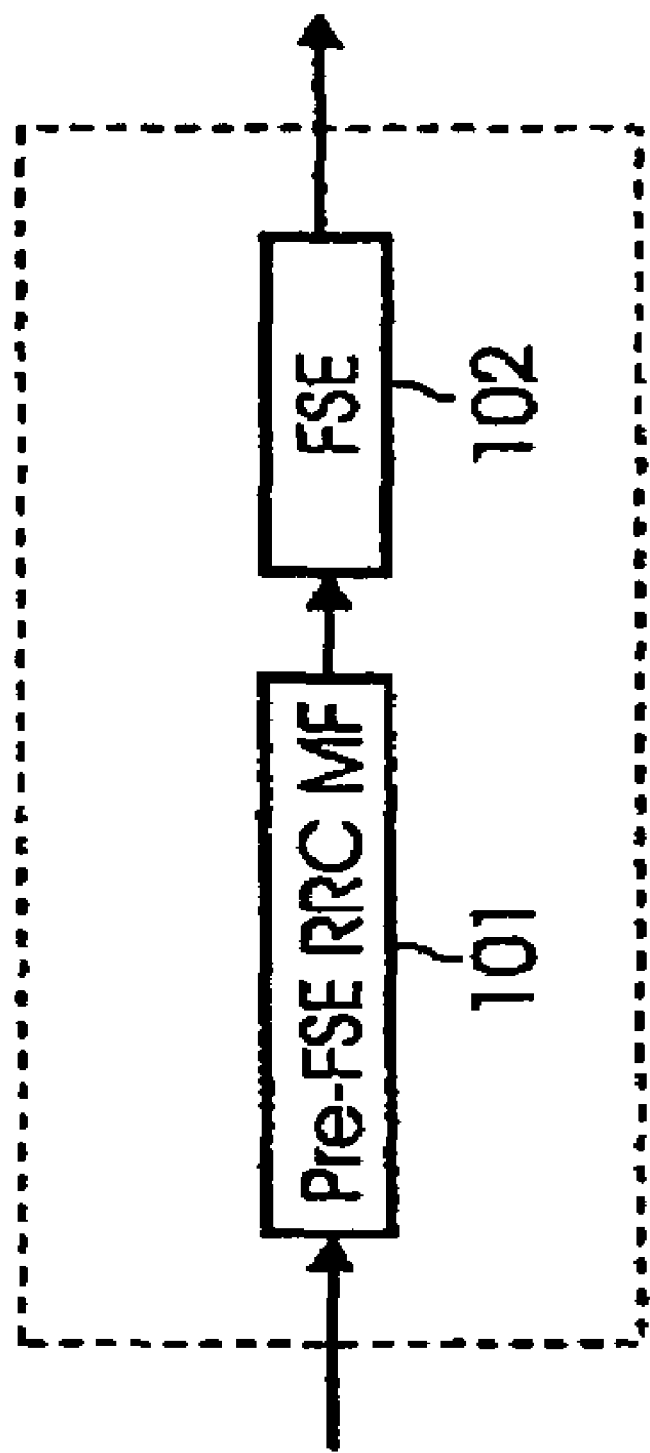
FIG. 1 is a high-level block diagram of a state-of-the-art MF plus FSE cascade system.

There are no known joint ISI-canceling and MF adaptive digital equalizer configurations that permit control the spectral side-lobes of the FSE so as to generate a RRC MF state across the full spectral band of the equalizer, and so, the state-of-the-art is defined to be the design in FIG. 1, an RRC MF 101 cascaded with a FSE 102.

Figure 2:
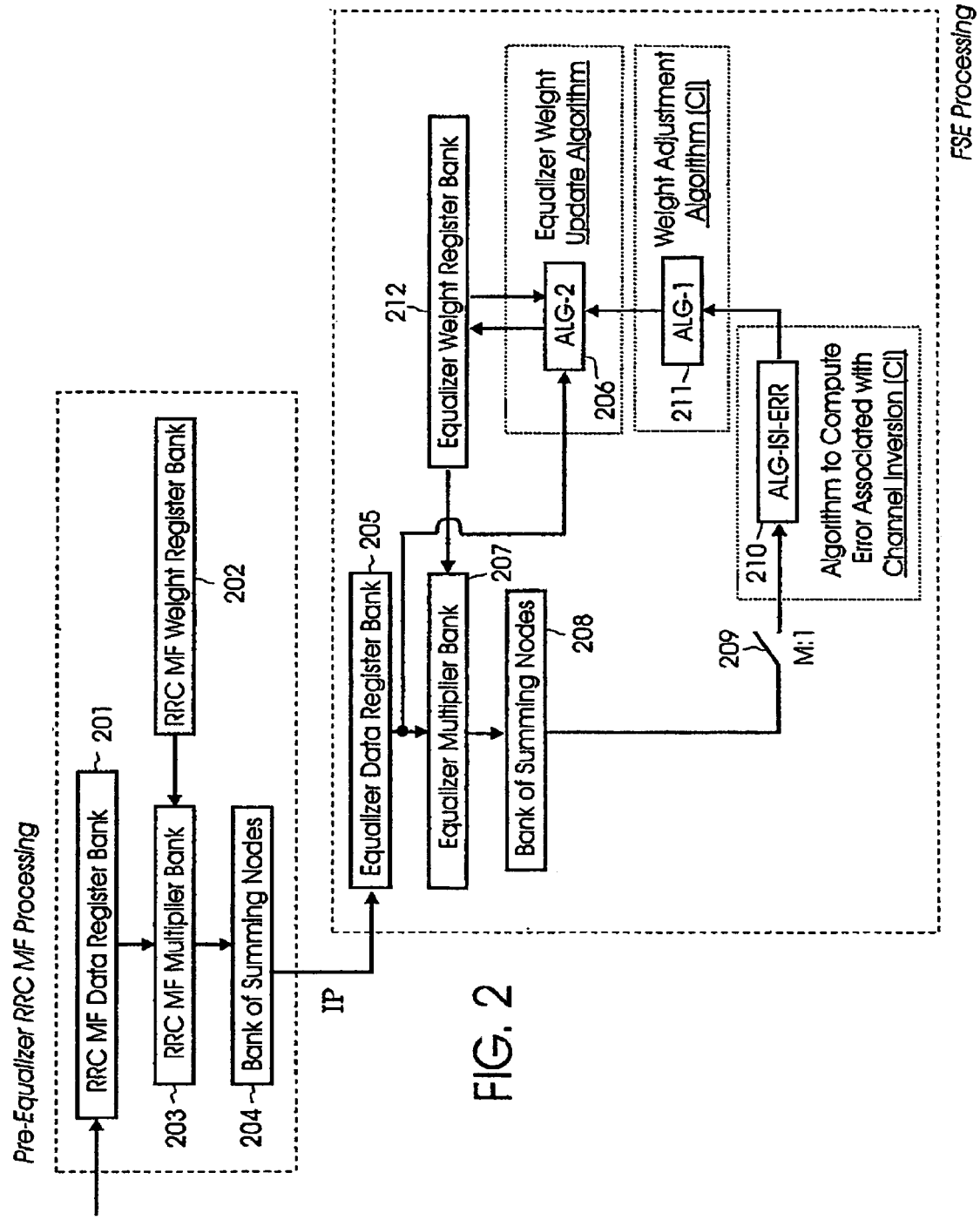
FIG. 2 is a composite high-level/detailed block diagram of a state-of-the-art MF plus FSE cascade (non-poly-phase partitioned) system.

FIG. 2 depicts a detailed block diagram representation of FIG. 2 showing the state of the art MF plus FSE cascade filter system operating at M-samples-per-symbol (M times the symbol rate).

The process is as follows. Samples of the distorted input waveform contained within a data register bank 201 associated with the RRC MF processing are shifted to the right by one register position. The sample of distorted waveform is input to the first (far left) position of the MF data register bank 201. The contents of the MF data register bank 201 then engage the contents of an RRC MF weight register bank 202, which stores the RRC MF coefficients, in an inner product computation using a bank of multiplier elements 203 and a bank of summation nodes 204. This inner product IP represents a sample of the post-filtered pre-equalized signal.

Next, the contents of the equalizer data register bank 205, storing the previous samples of the post-filtered and pre-equalized signal, is shifted to the right by one register position. The sample of the previously computed inner product IP is input to the first register position of the equalizer data register bank 205. The contents of the equalizer data register bank 205 then engage the contents of the equalizer weight register bank 206, storing the current values of the equalizer's weights, in an inner product computation using a bank of multiplier elements 207 and a bank of summation nodes 208. This inner product represents a sample of the equalized signal sampled at M-samples-per-symbol.

The equalized sample is then passed to a M:1 commutator 209 which decimates the equalized signal to the symbol rate. The decimated signal is then passed to an algorithm ALG-ISI-ERR 210 that forms the error needed to drive the weights in accordance with criterion for ISI cancellation. Three different state-of-the-art configurations for ALG-ISI-ERR 210 are based upon a training sequence, a decision device, or a statistically based update. These configurations will be presented in detail during the description of the embodiments of the present invention.

Next, the error from ALG-ISI-ERR is delivered to an algorithm ALG-1 211 that transforms the error into an adjustment signal used to update the equalizer's weights in accordance with the criterion for channel inversion. ALG-1 211 refers to one of any number of algorithms that can transform the error into a signal capable of controlling the adaptation of the equalizer's weights.

One possible configuration for ALG-1 211 is shown in FIG. 3 and consists of a complex conjugation operator 301, a scalar adaptation constant μ 302, and a multiplier 303. The adaptation constant μ 302 multiplies the ISI equalization error to form a product representing an adjustment signal for the weight update associated with the channel inversion process. The operating range for the adaptation constant μ 302 is $$0 < \mu < \mu_{crit} \quad [1]$$

where the critical value $\mu_{crit}$ is inversely proportional to the energy of the samples of distorted signal contained with in the equalizer data register bank 201 (ref. FIG. 2) at the current iteration.

Continuing with the process flow of FIG. 2, the adjustment signal produced at the output of ALG-1 211 is then delivered to an algorithm ALG-2 212 which updates the contents of the equalizer weight register bank 206. ALG-2 212 refers to one of any number of algorithms that can make use of an adjustment signal to update the contents of the equalizer weight register bank 206.

One possible configuration for ALG-2 212 is shown in FIG. 4. The sample of adjustment signal formed from the output of ALG-1 212 (ref. FIG. 2) multiplies the contents of the equalizer data register bank 205 (ref. FIG. 2) using a bank of multiplier elements 401. The resulting bank of products is added to the current contents of the equalizer weight register bank 206 (ref. FIG. 2) using a bank of summing nodes 402. The bank of sums produced is stored in the equalizer weight register bank 206 (ref. FIG. 2).

As a specific example of the equalizer's FF weight update, the contents of the first (far left) register of the equalizer data register bank 205 (ref. FIG. 2) multiplies the adjustment signal produced from ALG-1 212 (ref. FIG. 2) using the first (far left) multiplier of the multiplier bank 401. The product adds to the first (far left) register position of the equalizer weight resister bank 206 (ref. FIG. 2) using first (far left) summing node of the bank of summing nodes 402 and the sum is stored in the first register position of the equalizer weight register bank 206 (ref. FIG. 2). The process continues with the updates associated with the next successive register positions of the equalizer weight register bank 206 (ref. FIG. 2).

Retuning to the processing in FIG. 2, after updating the contents of the equalizer weight register bank, the entire processing of the MF and FSE cascade system repeats with the contents of the MF data register bank 201 shifted to the right by one position to prepare for the next pre-filtered sample to be input.

DETAILED DESCRIPTION OF THE INVENTION

Figure 5:
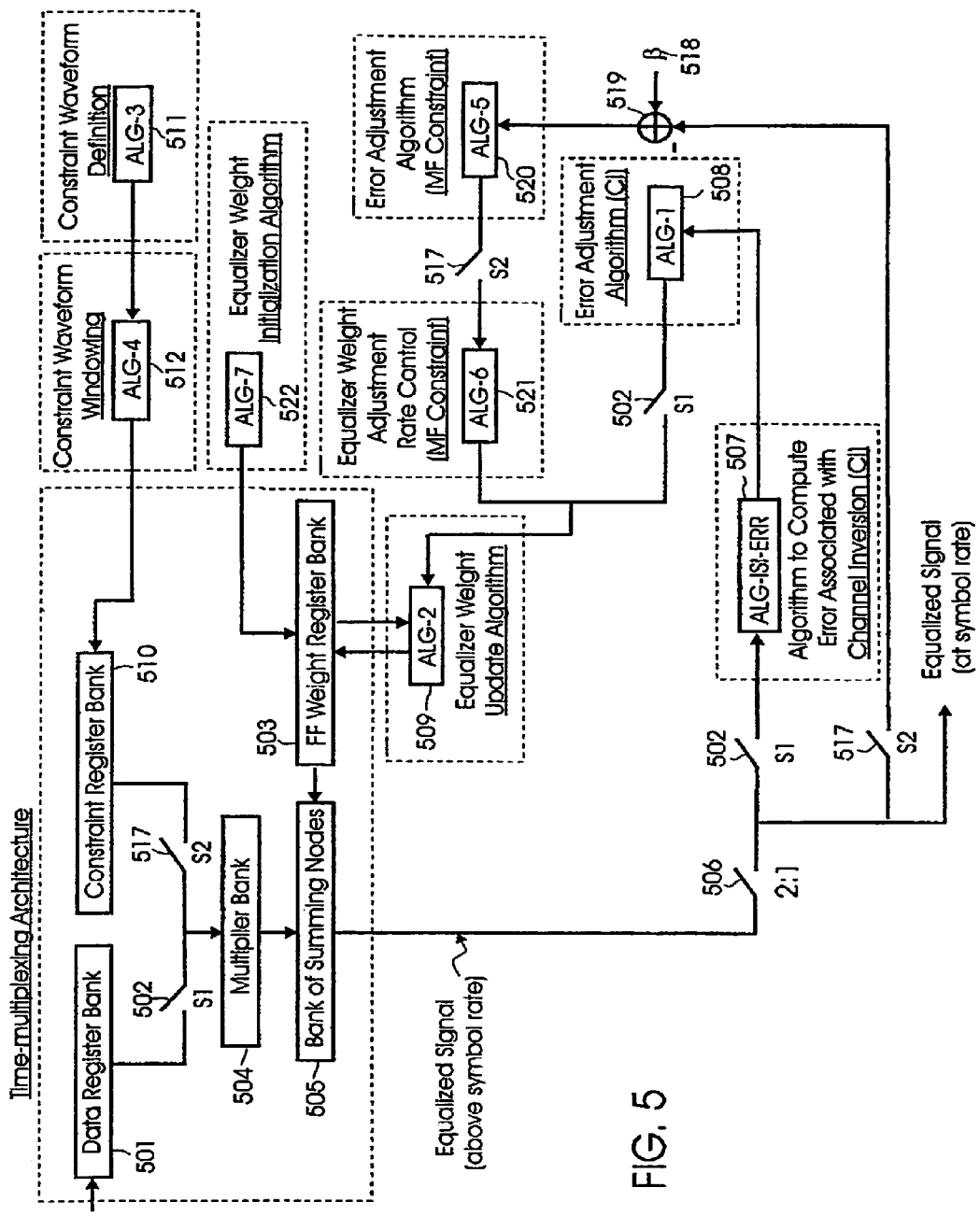
FIG. 5 is a high-level/detailed block diagram of the joint ISI-canceling and MF adaptive equalizer operating at 2-samples-per-symbol (M=2) in accordance with a preferred embodiment of the present invention.

FIG. 5 depicts a detailed block diagram of the joint ISI-canceling and MF adaptive equalized in accordance with a preferred embodiment of the present invention. FIG. 5 indicates the time-multiplexing architecture in which a single multiplier bank 504 is utilized to perform two separate inner product computations, that associated with the channel inversion update and that related to MF processing. In this embodiment the equalizer operates at 2-samples-per-symbol (twice the symbol rate M=2);

Elements currently residing within a data register bank 501 are shifted to the right by one position. A sample of the distorted input waveform is then loaded into the first position of the data register bank 501. At time t_1, after the current distorted sample enters the first data register position, switch S1 502 is closed to allow the contents of the data register bank 501 to engage the contents of a second register bank 503, storing values of the equalizer's feedforward (FF) weights, in an inner product using a bank of complex multiplier elements 504 and summation nodes 505. This inner product represents the current sample estimate of the equalized signal. Samples of the equalized signal calculated from the previous inner product are then passed through a 2:1 commutator 506, which discards every other sample to decimate to the symbol rate. The samples of decimated signal are then delivered to switch S1 502. Switch S1 502 in this position prohibits the inner product samples associated with the MF processing from entering the signal processing chain associated with the channel inversion process. With switch S1 502 closed, samples of the equalized signal are delivered to an algorithm ALG-ISI-ERR 507 to form the error signal associated with the channel inversion update.

The error signal associated with the channel inversion is then delivered to an algorithm ALG-1 508 that transforms the error into an adjustment signal used to update the equalizer's weights in accordance with the criterion for channel inversion. ALG-1 508 refers to one of any number of algorithms that can control the adaptation of the equalizer's weights.

FIG. 3 illustrates a detailed block diagram of ALG-1 508 in accordance with a preferred embodiment of the present invention as previously described and discussed.

Referencing FIG. 5, the adjustment signal formed at the output of ALG-1 508 is then passed to switch S1 502. In this position, switch S1 502 permits an update of the equalizer's weights when the adjustment signal is derived from the channel inversion process and prevents the channel inversion error adjustment signal from updating the weights when the present invention switches its mode of operation to the MF processing. With switch S1 502 in a closed position, the adjustment signal derived from ALG-1 508 is delivered to algorithm ALG-2 509 which performs an update of the contents of the equalizer's FF weight register bank 503.

ALG-2 509 refers to one of any number of algorithms that can control the adaptation of the equalizer's weights.

FIG. 4 illustrates a detailed block diagram of ALG-2 509 in accordance with a preferred embodiment of the present invention as previously described and discussed.

This completes the ISI-cancellation process of the present invention for the current iteration.

Next, the MF processing is initiated. A third register bank 510 of the present invention stores samples of a signal defining samples of the constraint waveform. This waveform represents a signal whose major spectral components reside in the high frequency band and pertains to any function that can become uncorrelated with the equalizer's impulse response within the constrained optimization algorithm so as to transform the equalizer's spectral side-lobes into a robust spectral mask.

A preferred embodiment of the present invention defines the constraint waveform as a set of independent complex sinusoids, each residing above the quarter-sample rate. For example, suppose the i-th constraint sinusoid in the set $\{i=1,2,\ldots,N\}$ is defined as $$c_i(k)=A\,\exp\{j(2\pi f_i k+\phi_i)\} \qquad [2]$$

The terms A, f, and $\phi$ refer to the constraint sinusoid's amplitude frequency, and phase. The frequency changes with time (equalizer iteration n) through index i so as to sweep out the entire out-of-band frequency band.

$$i=(n-1)(\bmod)N+1 \qquad [3]$$

The total number of independent sinusoids N is determined by trial and error tuning to maximize the full-received SNR. A preferred embodiment of the present invention spaces the complex tones at equidistant frequency intervals starting at the spectral nulls of the pre-FSE RRC MF and ending at the half-sampling rate.

Other embodiments may increment the frequency as in a ramping function or FM sweep (linear variation with iteration index n), or higher order non-linear variations. The constraint waveform may also be defined to be a real sinusoid or a real cosinusoid. Sinusoidal amplitude A may take on any value above zero, A>0, or may take on a time-varying format A(t) if desired. An arbitrary phase either random or deterministic $\phi$ can be included or can be derived from many phases $\phi_i$. With respect to the constraint vector sinusoidal tap index k ranges from 1 to L where L is the number of equalizer coefficients.

Referring back to FIG. 5, after the contents of the equalizer FF weight register bank 503 have been updated using ALG-2 509 in accordance with the criterion for channel inversion, samples of the signal representing the constraint waveform are loaded into the constraint register bank 510 using an algorithm ALG-3 511. ALG-3 511 refers to one of any number of algorithms that can be used to define the contents of the constraint register bank 510.

FIG. 6 depicts a detailed block diagram of ALG-3 511 in accordance with a preferred embodiment of the present invention. An index i is formed from an overflow counter 601 that cyclically counts between 1 and N, at the symbol rate, and indexes a register bank 602 storing the N out-of-band constraint frequencies. The overflow counter 601 is comprised of a scalar fixed to the value of 1 603, a register 604 to store the current state of the increment, an overflow test 605 to reset the value of the counter register 604 to 1 after the count exceeds the value set by a parameter N 606 which the overflow test 605 uses to conduct its comparison, and a summing node 607 to perform the incrementation of the counter register 604.

At the conclusion of the ISI-cancellation update, overflow counter 601 increments index i to access the next frequency in the frequency array 602. The selected frequency $f_i$ is then passed to a sinusoidal generator 608 which generates samples of the complex sinusoid.

Referencing FIG. 5, the samples of constraint waveform are then loaded into the constraint register bank 510, but can also be passed first to an optional algorithm ALG-4 512 when the constraint waveform is sinusoidal in nature to limit duty cycle as a means to reduce the computational complexity of the MF processing. The composition of ALG-4 512 will be discussed later.

Since the samples of each sinusoid are known apriori to the equalization, the constraint waveform may be loaded from ROM. Thus, an alternate embodiment of the ALG-3 511 and ALG-4 512 combination is a ROM lookup table.

Continuing with the process flow in FIG. 5, at time t_2, shortly after time t_1 and prior to the input of the next distorted sample to be processed, switch S1 502 is opened and a second switch S2 517 is closed to allow computation of a second inner product, this time between the contents of the constraint register bank 510 and the contents of the equalizer FF weight register bank 503. Once again the bank of multiplier elements 504 and bank of summing nodes 505 are used in forming the inner product. This inner product represents a measurement of the orthogonality between the equalizer's weights and the complex constraint sinusoid residing at frequency $f_i$ at the current iteration.

The sample of the previous inner product between the equalizer's weights and the constraint waveform is then passed to the 2:1 commutator 506, which discards every other sample. Switch S2 517 is again encountered to deliver the orthogonality inner product to the subsequent algorithms involved in the MF processing. With switch S2 517 closed the orthogonality inner product at the output of the 2:1 decimator 506 is subtracted from a parameter $\beta$ 518, termed the constraint level, using differencing node 519. The constraint level $\beta$ 518 defines the targeted strength of the orthogonality between the equalizer's weights and the constraint waveform. The operating range for $\beta$ 518 is $$0\le\beta\le1 \qquad [4]$$

The difference, termed the constraint error, is passed to an algorithm ALG-5 520 that controls the rate of acquisition of the constraint update. A preferred embodiment of the present invention sets $\beta=0$ to maximize the strength of the orthogonality built between the equalizer's weights and the constraint waveform. In turn, the differencing node 519 is not necessary and so is removed. ALG-5 520 refers to any number of algorithms that can be used to dictate the rate of acquisition of the constraint update.

FIG. 7 depicts a detailed block diagram of ALG-5 520 in accordance with a preferred embodiment of the present invention. Samples of the MF constraint error are passed to a complex conjugation operator 701 and the result is scaled by a parameter $\alpha$ 702, equal to the inverse of the number of samples of the complex constraint sinusoid waveform multiplied by the amplitude of the complex constraint sinusoid, using a multiplier element 703. When the constraint sinusoid is of unit amplitude the multiplicative parameter $\alpha$ 703 reduces to 1/L. The scaled MF constraint error represents an adjustment signal for the equalizer weight update associated with the MF processing.

In FIG. 5 the adjustment signal formed at the output of ALG-5 520 is then passed to switch S2 517. In this position, switch S2 517 permits an update of the contents of the equalizer's FF weight register bank 503 when the adjustment signal is derived from the MF constraint error and prevents the MF constraint error adjustment signal from updating the contents of the equalizer FF weight register bank 503 when the present invention switches its mode of operation to back to the channel inversion process.

With switch S2 517 closed the adjustment signal derived from the MF constraint error is passed to an optional algorithm ALG-6 521 to control the rate at which the contents of the equalizer weight register bank 503 are to be updated in accordance the criterion for the MF constraint. ALG-6 521 refers to any number of algorithms that can be used to dictate the update rate of the equalizer's weights in accordance with the criterion for the constraint.

Figure 8:
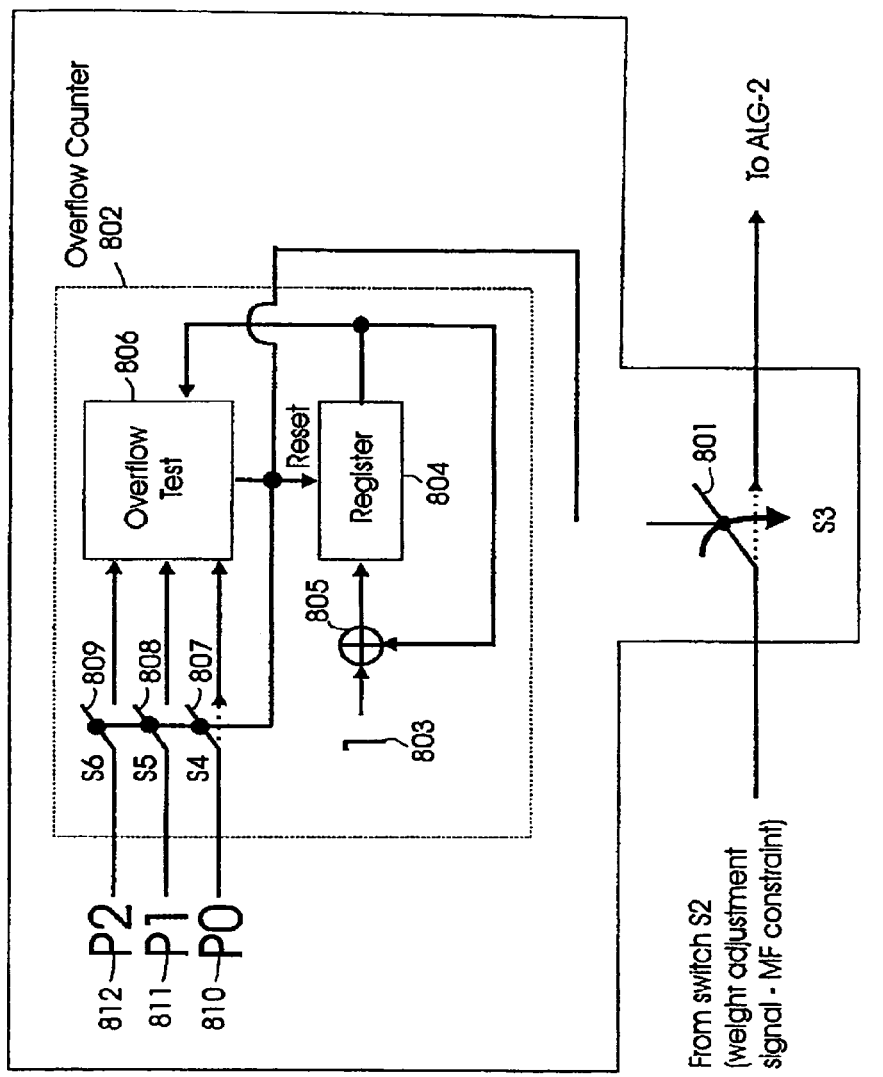
FIG. 8 is a detailed block diagram of the rate control algorithm for the constraint update of the equalizer weights in accordance with a preferred embodiment of the present invention.

FIG. 8 depicts illustrates ALG-6 521 in accordance with a preferred embodiment of the present invention. The adjustment signal for the MF constraint update is passed to a switch S3 801 whose open/closed state is controlled by an overflow counter 802. The overflow counter 802 is comprised of a scalar fixed to the value of 1 803, a register 804 to store the current state of the increment, a summing node 805, an overflow test 806, switches S4 807, S5 808 and S6 809, and three parameters, P0 810, P1 811, and P1 812, to dictate the maximum count of the overflow counter 802.

As the joint ISI-canceling and MF adaptive equalizer initiates processing the overflow counter 802 counts at the symbol rate from 1 to the value set by parameter P0 810 whose value is accessed by the overflow counter 802 through switch S4 807 which, at initial conditions, is in a closed position. Through the duration of this count, switch S3 801 is in a closed position to allow the adjustment signal derived from the MF constraint error to update the contents of the equalizer FF weight register bank 503 (ref. FIG. 5). When the incremental count in the register 804 exceeds the value specified by P0 810 the overflow test 806 results in a binary TRUE, and switches S3 801 and S4 807 are opened. Switch S4 807 is then disabled from the processing and remains in an open state throughout the remainder of the joint ISI-canceling and MF update.

The increment register 804 is then set to zero and switch S5 808 is closed to allow the overflow test 806 to use the value given by parameter P1 811 as the new threshold of the maximum count. As the update of the joint process equalizer continues, the overflow counter 802 starts counting again from 1, but counts this time to the value given by P1 811. During this counting switch S3 801 remains in an open position to keep the constraint update from updating the equalizer weights.

Switch S3 801 remains in an open position until the value in the counter register 804 exceeds the value given by P1 811 upon which the overflow test 806 results in a binary TRUE again which prompts switch S3 801 to close to resume updates of the contents of the equalizer's FF weight register bank 503 (ref. FIG. 5) in accordance with the MF constraint criterion. At the same time that switch S3 801 is closed, switch S5 808 is opened and switch S6 809 is closed to set the maximum count of the overflow counter 806 to the value given by P2 812.

The increment register 804 is again set to zero and as the update of the joint process equalizer continues, the overflow counter 802 starts counting again from 1 803, but counts this time to the value given by P2 812. During this counting switch S3 801 remains in a closed position until the value in the counter register 804 exceeds the value given by P2 812 upon which the overflow test 806 results in a binary TRUE again which prompts switch S3 801 to open to halt the update equalizer's weights. At the same time that switch S3 801 is opened, switch S5 808 is closed and switch S6 809 is opened to set the maximum count of the overflow counter 802 back to the value given by P1 811. This process continues with the increment register 804 is again set to zero switch S3 801 controlling constraint update rate through switches S5 808 and S6 809, and parameters P1 811 and P2 812.

Referencing FIG. 5 again, after passing through ALG-6 521 the adjustment signal associated with the constraint error, and derived from ALG-5 508, is delivered to algorithm ALG-2 509 which performs an update of the contents of the equalizer's FF weight register bank 503, this time in accordance with the MF constraint criterion. ALG-2 509 refers to one of any number of algorithms that can control the adaptation of the equalizer's weights.

FIG. 4 illustrates a detailed block diagram of ALG-2 509 in accordance with a preferred embodiment of the present invention as previously described and discussed.

This completes the MF portion of the joint ISI-canceling and MF operation at the current iteration.

The entire joint process equalizer update is repeated for the next iteration beginning with the elements currently residing within the data register bank 501 being shifted to the right by one position and the next sample of the distorted input waveform being loaded into the first position of the data register bank 501. The ISI-cancellation process is initialized once again with closure of switch S1 502 and the computation the inner product between the contents of the data register bank 501 and the contents equalizer FF weight register bank 503.

We now discuss several possible configurations for ALG-ISI-ERR 507 of FIG. 5 which generates the error sequence that drives the update of the equalizer's weights in accordance with the criterion for the cancellation of ISI. ALG-ISI-ERR 507 pertains to any state-of-the-art algorithm that can derive an error signal pertaining to the cancellation of ISI.

Figure 9:
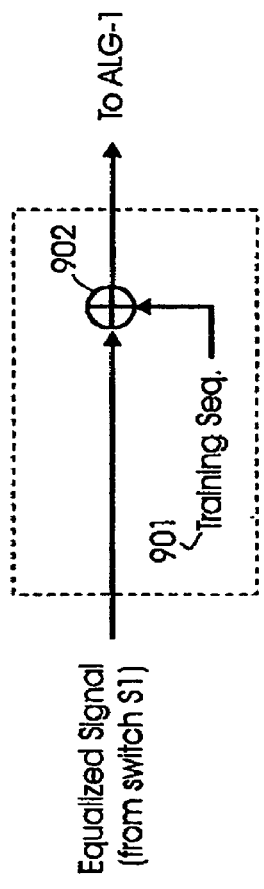
FIG. 9 is a detailed block diagram of the algorithm that generates the channel inversion error which utilizes a training sequence-based update in accordance with a preferred embodiment of the present invention.

FIG. 9 depicts a detailed block diagram of ALG-ISI-ERR 507 of FIG. 5 in accordance with a preferred embodiment of the present invention. This embodiment utilizes a training sequence 901 to form the ISI error signal.

With respect to FIG. 9, after passing through the 2:1 commutator 506 (ref. FIG. 5) and switch S1 502 (ref. FIG. 5) the equalized signal is subtracted from a known training sequence 901, which represents samples of the distortionless transmitted sequence at symbol rate, using a differencing node 902. The difference signal represents the ISI error sequence and is passed to ALG-1 508 (ref. FIG. 5) to generate the adjustment signal that directs the equalizer's weight in accordance with ISI cancellation.

Figure 10:
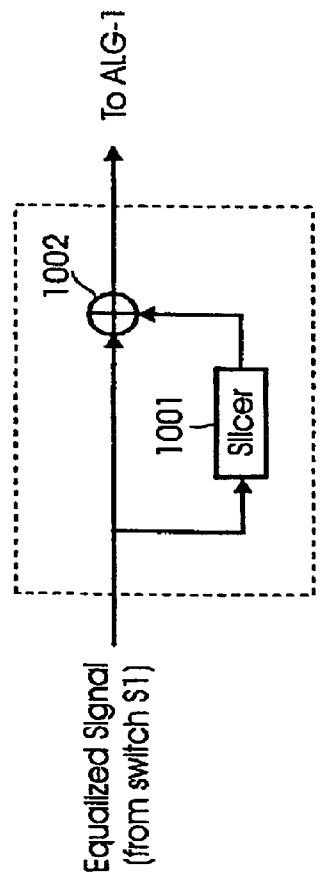
FIG. 10 is a detailed block diagram of the algorithm that generates channel inversion error which utilizes a decision-directed update in accordance with a preferred embodiment of the present invention.

FIG. 10 depicts a detailed block diagram of ALG-ISI-ERR 507 of FIG. 5 in accordance with an alternate embodiment of the present invention.

With respect to FIG. 10, after passing through the 2:1 commutator 506 (ref. FIG. 5) and switch S1 502 (ref. FIG. 5) the equalized signal is passed through a slicer (decision device) 1001 which quantizes the equalized signal to the closest 2-tuple of a decision region. A differencing node 1002 subtracts the pre-quantized sample from the quantized sample to form the error sequence which is then passed onto ALG-1 508 (FIG. 5) to generate the equalizer weight adjustment signal. This embodiment is termed the decision-directed embodiment.

Figure 11:
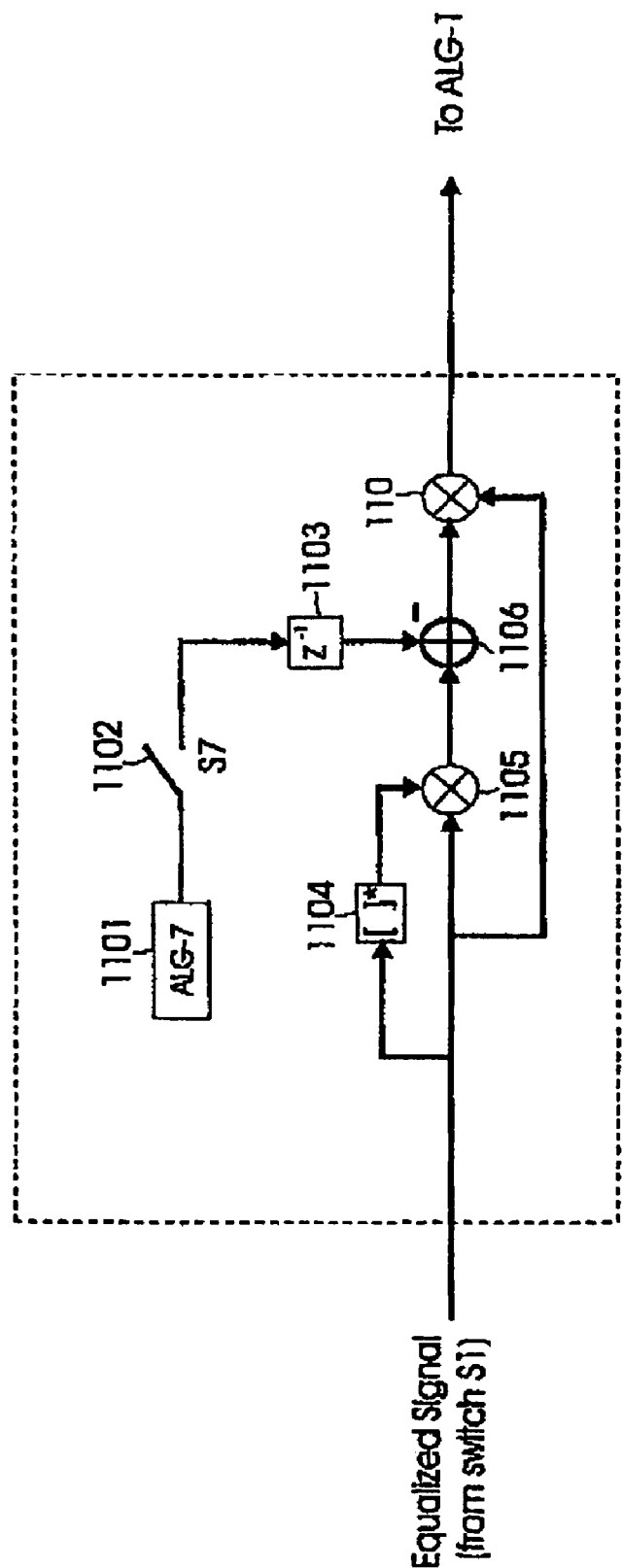
FIG. 11 is a detailed block diagram of the algorithm that generates the channel inversion error which utilizes a blind update via the constant modulus algorithm (CMA), in accordance with a preferred embodiment of the present invention.

FIG. 11 depicts a detailed block diagram of ALG-ISI-ERR 507 of FIG. 5 in accordance with an alternate embodiment of the present invention. In this embodiment the channel inversion error is formed via the use of a statistical-based update.

With respect to FIG. 11, an algorithm ALG-7 1101 computes the value of a parameter $R_m$ measuring a ratio of statistical moments of the original modulated signal. A switch S7 1102 is closed to deliver the value of parameter $R_m$ to a register 1103 where it will reside throughout the processing. Switch S7 1102 is then opened. Therefore, ALG-7 1101 executes only a single time to calculate $R_m$ and then is removed from the processing when switch S7 1102 is opened.

After passing through the 2:1 commutator 506 (ref. FIG. 5) and switch S1 502 (ref. FIG. 5) the input sample of equalized signal is delivered to a complex conjugation device 1104. The output of this complex conjugation device is then multiplied by the input sample of equalized signal using a multiplier device 1105. The content of the register 1103 storing the value of parameter $R_m$ is subtracted from this product via a differencing node 1106 and this difference is then multiplied by the input sample of equalized signal via a multiplier element 1107. This last product represents a sample of the error sequence delivered to ALG-1 508 (ref. FIG. 5) to form the weight adjustment signal as in previous embodiments.

The statistically based parameter $R_m$ is the ratio of moments of the amplitudes $a_j\{j=1, 2, \ldots, B\}$ of the B-ary pre-pulse-shaped modulated constellation.

$$R_m = E[|a_j|^{2m}]/E[|a_j|^m] \qquad [3]$$

ALG-7 1101 refers to one of any number of algorithms that can compute the ratio of $E[|a_j|^{2m}]$ to $E[|a_j|^m]$ where the operator $E[x]$ denotes the expectation of x.

Figure 12:
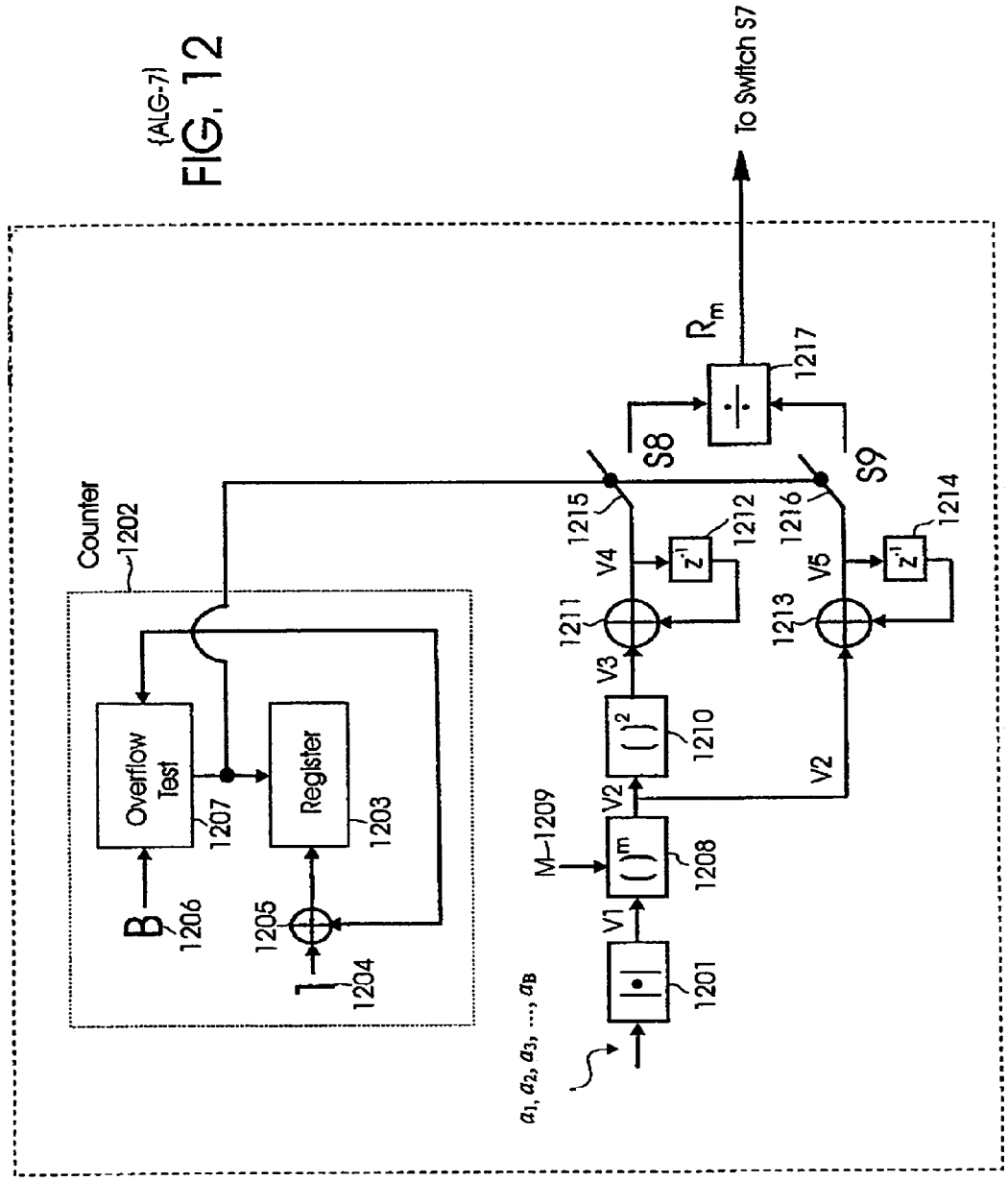
FIG. 12 is a detailed block diagram of the algorithm that calculates the modulus factor of the blind CMA update, in accordance with a preferred embodiment of the present invention.

FIG. 12 depicts a detailed block diagram of ALG-7 1101 of FIG. 11 in accordance with a preferred embodiment of the present invention. The first amplitude $a_1$ of the set of amplitudes $a_j\{j=1, 2, \ldots, B\}$ of the B-ary pre-pulse-shaped modulated constellation is passed through an absolute value operator 1201 to produce a value V1. A counter 1202 increments the value in a register 1203 from 0 to 1 with the use of a scalar 1204 set to the value of 1 and a summing node 1205. A scalar 1206 set to the value of B and an overflow test 1207 test whether the contents in register 1203 have exceeded the value given by parameter B 1206.

V1 is passed though a power operator 1208 which computes V1 to the m-th power with use of parameter m 1209. The output V2 is then sent to two different paths of processing, an upper and lower path. In the upper path V2 is passed through a squaring operation 1210 to form V3 which, in turn, is delivered to the combination of a summing node 1211 and a delay register 1212 to perform an accumulation of future V3 values. In the lower path V2 is delivered to the combination of a summing node 1213 and delay register 1214 to perform an accumulation of future V2 values. The entire process is repeated with input of the second 2-tuple $a_2$.

After all of the constellation 2-tuples have been processed the value in the increment register 1203 increments one more time. At this point, the value in the increment register 1203 exceeds the value given by parameter B 1206 and a CLOSE signal is sent to switches S8 1215 and S9 1216. A division operator 1217 forms the ratio of the final values of V2 and V3 to form $R_m$.

Figure 13:
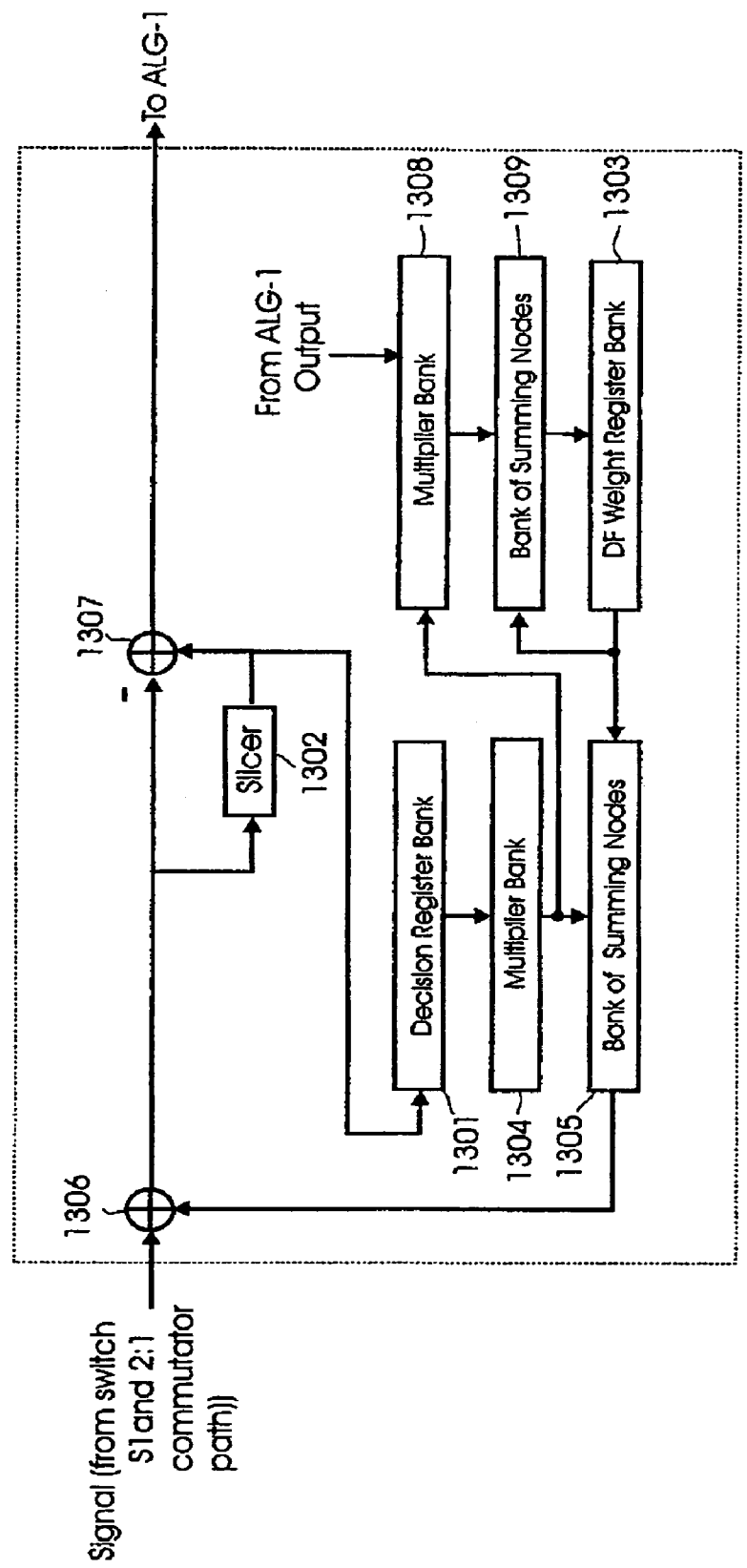
FIG. 13 is a detailed block diagram of the algorithm which performs a decision-feedback update of the joint ISI-canceling and MF equalizer in accordance with a preferred embodiment of the present invention.

FIG. 13 depicts a detailed block diagram of an alternate embodiment of the present invention. This embodiment closely resembles decision-directed embodiment with the exception that a feedback signal formed from a weighted set of previous slicer decisions adds to the equalized signal. This embodiment of the present invention is termed the decision-feedback embodiment.

The process for the decision-feedback embodiment is as follows. With the output of the 2:1 commutator 506 (ref. FIG. 5) already formed and passed through switch S1 502 (ref. FIG. 5), the contents of a decision register bank 1301, which stores a set of the previous decisions produced from a slicer 1302, engage the contents of a weight register bank 1303, storing values of set of DF weights, in an inner product computation using a bank of multiplier elements 1304 and summing nodes 1305. This inner product computation represents a sample of the DF's contribution to the total equalized signal.

Next, the incoming signal to the DF embodiment is added to the DF sample using a summation node 1306. The result of the addition represents a sample of the equalized signal and is passed to the slicer device 1302. The equalized sample is subtracted from decision produced from the output of the slicer 1302 via a differencing node 1307 forming a sample of the ISI-cancellation error sequence. The error sample is then delivered to ALG-1 508 (ref. FIG. 5) to form the adjustment signal needed to update the contents of the equalizer's FF weight register bank 501 (ref. FIG. 5).

The sample of adjustment signal formed from ALG-1 508 then multiplies contents of the decision register bank 1301 using a bank of multiplier elements 1308. The resulting bank of products then adds to the current contents of the DF weight register bank 1303 using a bank of summing nodes 1309, and the result is stored in the DF weight register bank 1303. As an example of the DF weight update, the contents of the first (far left) register of the decision register bank 1301, storing a set of previous decisions, multiplies the adjustment signal produced from ALG-1 508. The product adds to the first (far left) register position of the DF weight resister bank 1303 and the sum is stored in the first register position of the DF weight register bank 1303. The update process continues with the next successive register positions of the DF weight register bank 1303.

At the completion of DF weight update the contents of the decision register bank 1301 are shifted to the right by one register position. The slicer 1302 output is delivered to first register position of the decision register bank 1301. The DF operation then repeats with the inner product of the decision register bank 1301 and the DF weight register bank 1303.

With the description of the basic processing of the joint ISI-canceling and MF adaptive equalizer completed we now return to descriptions of both ALG-4 512 and ALG-7 522.

ALG-4 512 performs windowing of the constraint waveform produced from ALG-3 511 at the current equalizer iteration. When the constraint waveform is sinusoidal in nature a windowing of the sinusoidal time series weights the non-causal and causal samples furthest from the midpoint of the total duty cycle with negligible amplitude (or zero amplitude depending upon the selected window function) while emphasizing those samples nearest the duty cycle midpoint with greater importance. As a result, the samples of the windowed constraint waveform of negligible amplitude offer negligible contribution to the inner product between the equalizer FF weights and constraint waveform associated with the MF processing. Hence, the their multiply operations need not be performed and the inner product reduces to performing only the central-most multiply operations that will restore a measure of performance equivalent to that of the non-windowed constraint waveform.

Figure 14:
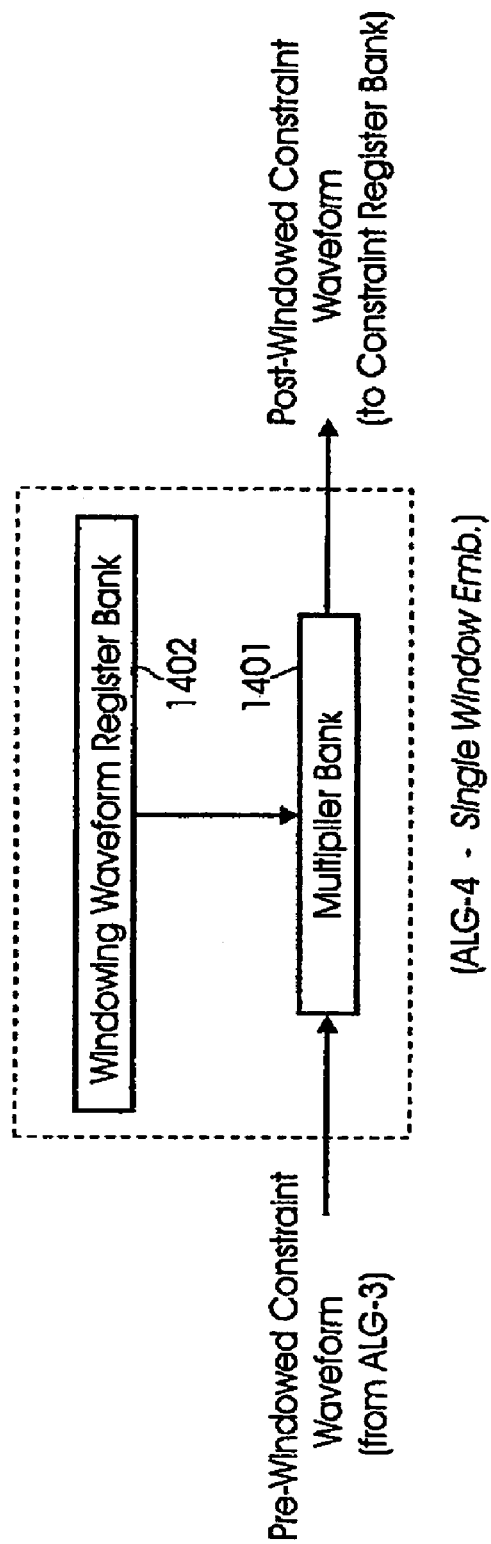
FIG. 14 is a detailed block diagram of the algorithm which performs a windowing of the constraint waveform using a single window function in accordance with a alternate embodiment of the present invention.

FIG. 14 illustrates a detailed block diagram of ALG-4 512 in accordance with a preferred embodiment of the present invention. This embodiment performs windowing of the constraint waveform using a single window function. Samples of the constraint waveform produced from ALG-3 511 (ref. FIG. 5) are passed to a multiplier bank 1401 which performs a point-by-point multiplication with contents of a register bank 1402 representing the window function. The resulting samples of windowed time series are then loaded into the constraint register bank 510 (ref. FIG. 5) and as the MF processing is initiated. However, in the inner product computation between the contents of the equalizer FF weight register bank 503 (ref. FIG. 5) and the contents of the constraint register bank 510 (ref. FIG. 5), only those central multiplications of the multiplier bank 504 (ref. FIG. 5) and central sums of the bank of summing nodes 505 (ref. FIG. 5) which correspond to the central samples of the windowed constraint waveform samples of non-zero or appreciable amplitudes are performed.

For the singular windowing waveform various types of window functions may suffice for truncating the constraint waveform time series. For example, an unweighted window contains a steep decay in its time series which maximizes the number of extreme causal and non-causal samples of the windowed waveform that are of zero or negligible amplitude. This, in turn, minimizes the number of central-most multiplications and sums that need be performed in the inner product associated with the MF constraint. The drawback, however, is that windowing with an unweighted function maximizes the amount of spectral leakage induced from waveform time series truncation which diminishes the strength of the orthogonality between equalizer and constraint waveform.

To compensate, the window function selected may contain a gradual decay of its time response such as the Hann, Hamming, Kaiser, etc. windows. For these windows, however, the number of samples of the windowed waveform, which are of zero or negligible amplitude, may not result in an appreciable workload reduction of the MF constraint processing. Hence, the window waveform is formed from a composite of multiple windows to achieved desired time series truncation with minimal spectral leakage.

Figure 15:
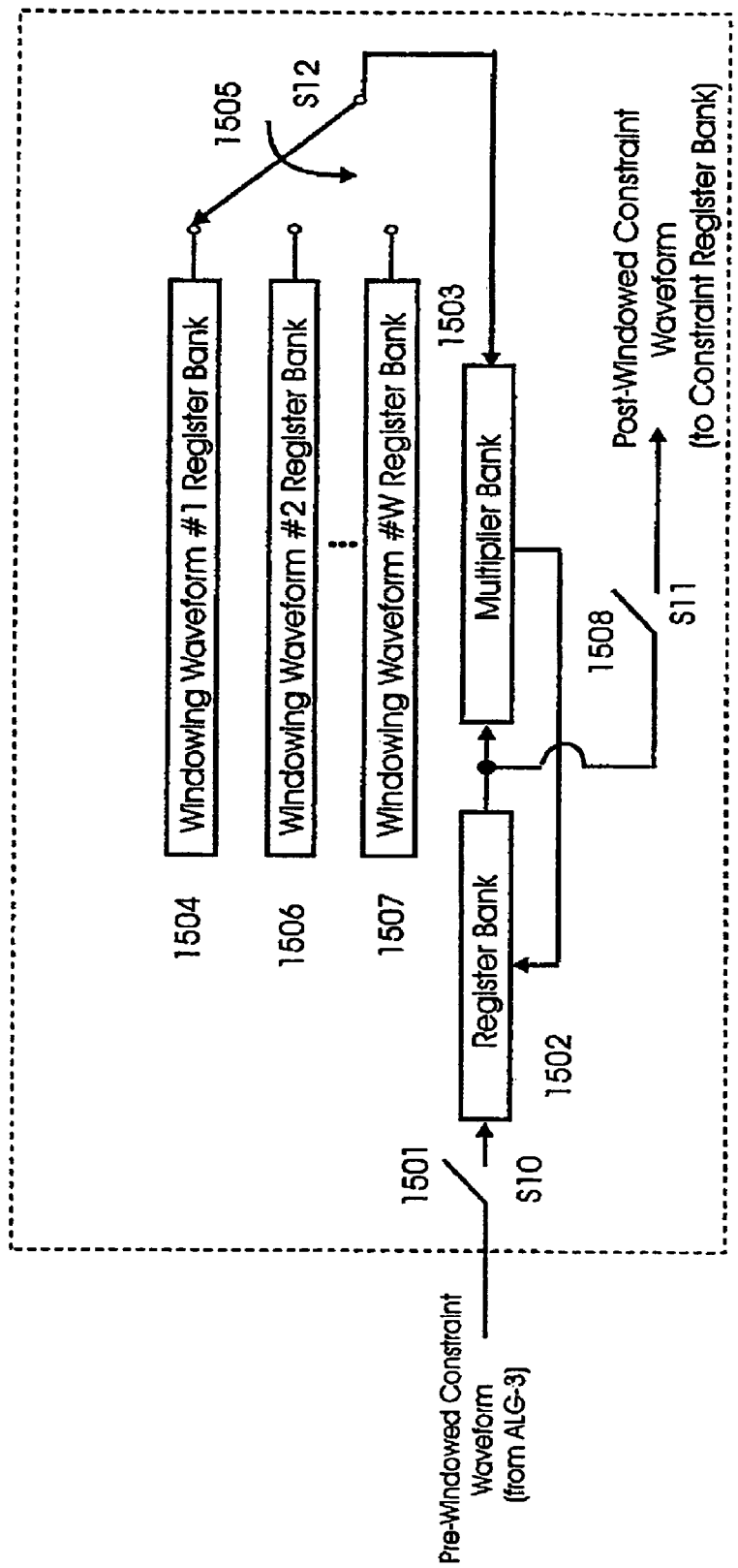
FIG. 15 is a detailed block diagram of an of the algorithm which performs a windowing of the constraint waveform using a window derived from a composite of many window functions in accordance with an alternate embodiment of the present invention.

FIG. 15 illustrates a detailed block diagram of ALG-4 512 in accordance with an alternate embodiment of the present invention. This embodiment performs windowing of the constraint waveform using multiple window functions. Switch S8 1501, initially in a closed position, allows the entire set of samples of the constraint waveform produced from ALG-3 511 (ref. FIG. 5) to be loaded to a register bank 1502. Switch S8 1501 is then opened. Next, a bank of multiplier elements 1503 performs a point-by-point multiplication of the pre-windowed samples contained in register bank 1502 with samples of the first windowing function contained in a register bank 1504. The bank of products is stored in register bank 1502. Switch S11 1508 remains in an open position until all windowing waveforms have been utilized. Switch S12 1505 then moves to the windowing waveform #2 register bank 1506. The bank of multiplier elements 1503 performs a point-by-point multiplication of the pre-windowed samples contained in register bank 1502 with samples of the second windowing function contained in register bank 1506. The bank of products is stored in register bank 1502. The process is repeated for all the windowing functions up to an including the last storing in windowing waveform #W register bank 1507. Then switch S11 1508 is closed to send the final version of the samples of windowed constraint waveform to the constraint register bank 510 (ref. FIG. 5).

ALG-7 522 is now discussed. Referencing FIG. 5, ALG-7 522 performs an initialization of the contents of the equalizer FF weight register bank 503 with the coefficients of the RRC MF as a means to decrease the acquisition time needed to form the MF characteristics of the equalizer's composite inverse channel and MF function.

Figure 16:
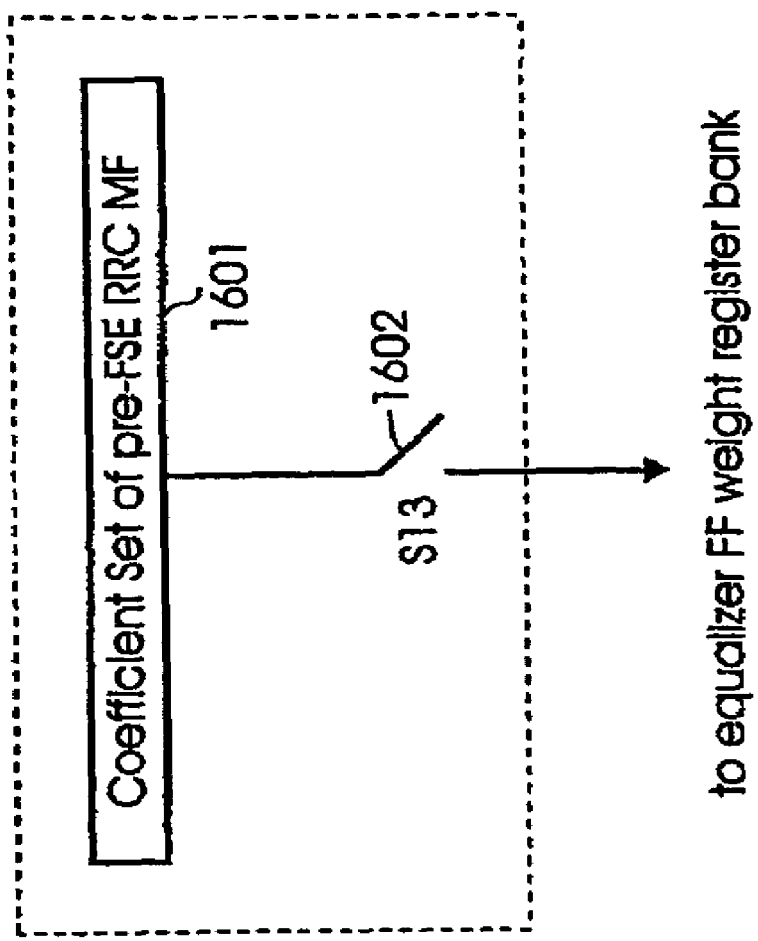
FIG. 16 is a detailed block diagram of the algorithm that performs an initialization of the contents of the equalizer FF weight register bank using the pre-FSE RRC MF taps in accordance with a preferred embodiment of the present invention.

FIG. 16 illustrates a detailed block diagram of ALG-5 522 in accordance with a preferred embodiment of the present invention. Prior to the contents of the data register bank being shifted to prepare for the first sample of the distorted waveform to be loaded into the first position of the data register bank 501 (ref. FIG. 5), switch S13 is closed to allow a coefficient set 1601 of the pre-FSE RRC MF, which spans the duration of the equalizer's FF weights, to be loaded into the register positions of the equalizer FF weight register bank 503 (ref. FIG. 5). Switch S12 1602 is then opened to disconnect ALG-7 522 (ref. FIG. 5) from the joint process equalizer update.

Figure 17:
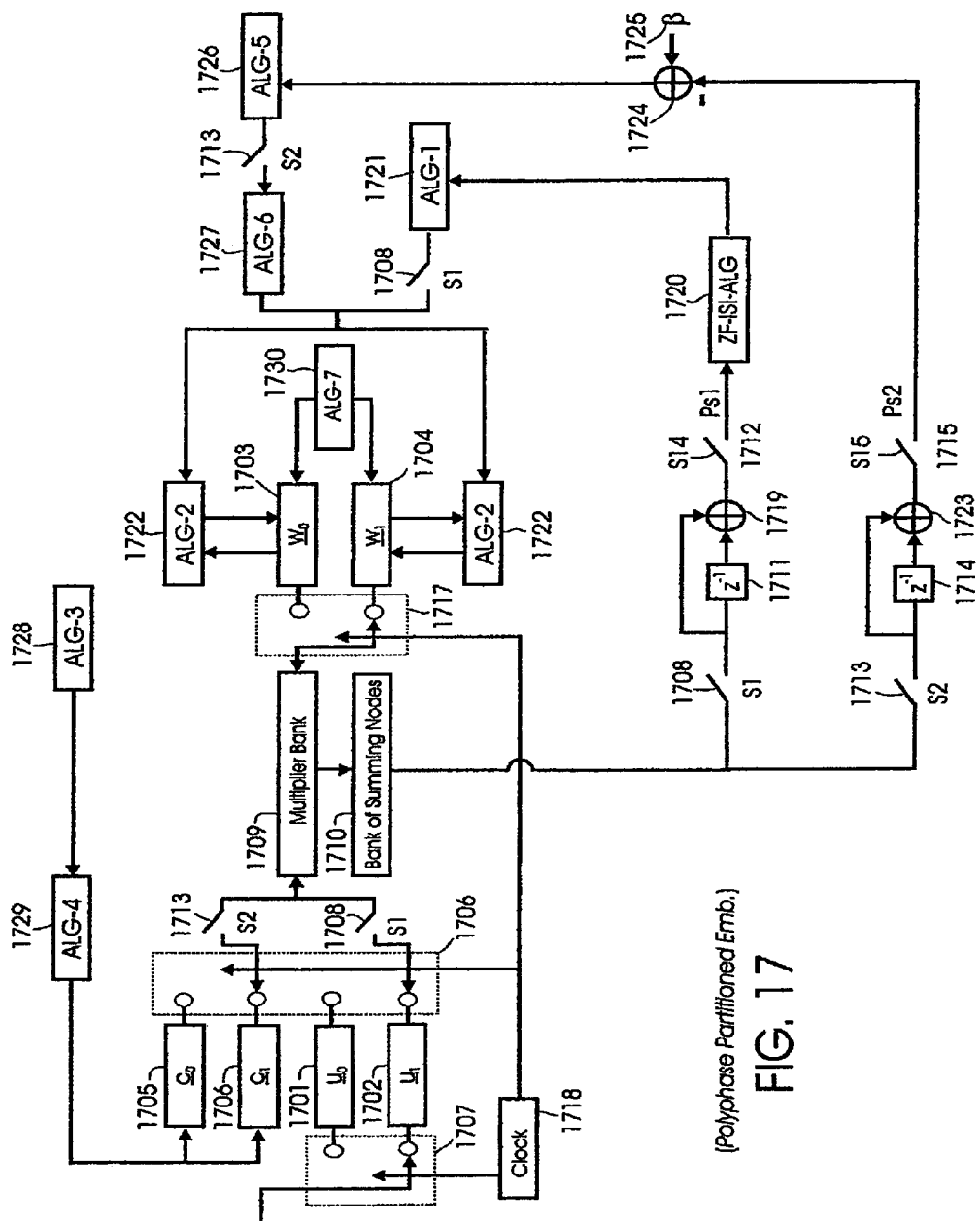
FIG. 17 is a detailed block diagram of the polyphase configuration of the joint ISI-canceling and MF adaptive equalizer in accordance with a preferred embodiment of the present invention.

FIG. 17 depicts a detailed block diagram of the joint ISI-cancelling and MF adaptive equalized partitioned as a polyphase process in accordance with a preferred embodiment of the present invention. The 2:1 decimator (ref. FIG. 5), previously at the output of the equalizer, is embedded within the fractional-spaced equalizer via the Nobel Identity. As a result, the data register bank 502 (ref. FIG. 5) is partitioned into two sub-register banks, $u_0$ 1701 and $u_1$ 1702, each of which is half the length of the original non-polyphase partitioned data register bank 502 (ref. FIG. 5). In a similar manner the equalizer weight register bank 503 (ref. FIG. 5) is partitioned into sub-register banks $w_0$ 1703 and $w_1$ 1704, and the constraint register bank 510 (ref. FIG. 5) is partitioned into sub-register banks $c_0$ 1705 and $c_1$ 1706.

The polyphase process of FIG. 17 is as follows. The elements contained within the data sub-register bank $u_1$ 1702 are shifted to the right by one position. A sample of the distorted input waveform is then delivered to the first register position of data sub-register bank $u_1$ 1702 via a 2:1 commutation device COM_1 1707.

At time t_1, a switch S1 1708 is closed to allow the contents of the data sub-register bank $u_1$ 1702 to engage the contents of equalizer FF weight sub-register bank $w_1$ 1704, storing half of the equalizer's weights, the odd indexed weights (or even indexed weights depending upon polyphase methodology), in an inner product computation using a bank of multiplier elements 1709 and a bank of summation nodes 1710.

In this embodiment, the polyphase configuration of the present invention, the number of multiplier elements in the multiplier bank 1709 and number of summing nodes in the bank of summing nodes 1710 are both approximately half that of each of the non-polyphase configuration. The inner product computation represents half the total equalized decimated result at the current iteration, and with switch S1 1708 closed the inner product is stored in a single delay element 1711 for future use. Switch S14 1712, currently in an open position, prevents the error sample associated with ISI cancellation from being formed until the second half of the total equalized decimated signal is computed.

Next, samples of the signal representing the constraint waveform are loaded into constraint sub-register banks $c_0$ 1705 and $c_1$ 1706 using algorithm ALG-3 1728, but as in the non-polyphase embodiment, can also be passed first to an optional algorithm ALG-4 1729 when the constraint waveform is sinusoidal in nature to limit duty cycle as a means to reduce the computational complexity of the MF processing. FIG. 6 illustrates a detailed block diagram of ALG-3 1728 in accordance with a preferred embodiment of the present invention as previously described and discussed. FIGS. 14–15 illustrate detailed block diagrams of ALG-4 1729 in accordance with preferred embodiments of the present invention as previously described and discussed.

At time t_2, shortly after time t_1 and prior to the input of the next distorted sample to be processed, switch S1 1708 is opened and a second switch S2 1713 is closed to allow computation of a second inner product, this time between the contents of the constraint sub-register bank $c_1$ 1706 and the contents of the equalizer FF weight sub-register bank $w_1$ 1704. Again the bank of multiplier elements 1709 and bank of summing nodes 1710 are used in forming this inner product. This second inner product represents the first half the total contribution to the sample measuring the orthogonality between the equalizer's FF weights and the constraint waveform at the current iteration. With switch S2 1713 closed it is stored in a single delay element 1714 for future use. Switch S15 1715, currently in an open position, prevents the MF constraint error from being formed until the second half of the total contribution to the measure of orthogonality between the equalizer's FF weights and the constraint waveform is formed. Switch S2 1713 is then opened.

Next, commutator COM 1 1707 moves to the data sub-register bank $u_0$ 1702, and a new sample of the distorted waveform is input to the first register position of data sub-register bank $u_1$ 1702. A second commutator COM 2 1716 moves to data sub-register bank $u_0$ 1701 and constraint sub-register bank $c_0$ 1705, while a third commutator COM 3 1717 moves to the equalizer FF sub-register bank $w_0$ 1703, with all commutator movements controlled by a clock 1718.

The elements contained within the data sub-register bank $u_0$ 1701 are then shifted to the right by one position and the next sample of the distorted input waveform is then delivered to the first register position of data sub-register bank $u_0$ 1701 via the commutation device COM_1 1707.

At time t_3, shortly after the input of the next distorted sample to data sub-register $u_0$ 1701, switch S1 1708 is closed to allow the contents of the data sub-register bank $u_0$ 1701 to engage the contents of equalizer FF weight sub-register bank $w_0$ 1703 in a third inner product computation using the bank of multiplier elements 1709 and bank of summing nodes 1710. With switch S1 1708 closed this third inner product is added to the first inner product currently stored in the delay register 1711 via a summing node 1719 to form a sum Ps1. Ps1 represents a sample of the equalized signal at the current iteration. Next, switch S14 1712, is closed to send sum Ps1 to ALG-ISI-ERR 1720 to form the error associated with ISI-cancellation. FIGS. 9–11 illustrate detailed block diagrams of ALG-ISI-ERR 1720 in accordance with preferred embodiments of the present invention as previously described and discussed.

The error is then sent to ALG-1 1721 to form the adjustment signal needed to update the equalizer's FF weights in accordance with the criterion for ISI cancellation. FIG. 3 illustrates a detailed block diagram of ALG-1 1721 in accordance with a preferred embodiment of the present invention as previously described and discussed.

Continuing with the process description of FIG. 17 the adjustment signal formed at the output of ALG-1 1721 is then passed to switch S1 1708. In this position, switch S1 1708 permits an update of the contents of the equalizer's FF weights when the adjustment signal is derived from the channel inversion error and prevents the channel inversion error adjustment signal from updating the FF weights when the present invention switches its mode of operation to the MF processing. With switch S1 1708 in a closed position, the adjustment signal derived from ALG-1 1721 is delivered to algorithm ALG-2 1722 which performs an update of the contents of the equalizer FF weight sub-register banks $w_0$ 1703 and an update of the contents in equalizer FF weight sub-register banks $w_1$ 1704. FIG. 4 illustrates a detailed block diagram of ALG-2 1722 in accordance with a preferred embodiment of the present invention as previously described and discussed.

This completes the weight update associated with the ISI-cancellation process at the current iteration for polyphase embodiment of the present invention.

At time t_4, shortly after time t_3 and prior to the input of the next distorted sample to be processed, switch S1 1708 is opened and switch S2 1713 is closed to allow computation of an inner product, the fourth inner product in the series, between the contents of the constraint sub-register bank $c_0$ 1705 and the contents of the equalizer FF weight sub-register bank $w_0$ 1703 using the bank of multiplier elements 1709 and the bank of summing nodes 1710 servicing the computation. With switch S2 1713 closed the fourth inner product is added to the second inner product currently stored in the delay register 1714 via a summing node 1723 to form a sum Ps2. Ps2 represents a sample of the total measure of orthogonality between the equalizer's FF weights and constraint waveform at the current iteration.

Next, switch S15 1715 is closed to send sum Ps2 onto the processing that derives the constraint error. Ps2 is subtracted from the constraint level parameter $\beta$ 1724 using differencing node 1725 as in the previous embodiments. The difference, termed the constraint error, is passed to an algorithm ALG-5 1726, as in prior embodiments, to form the adjustment signal needed to update the contents of both equalizer FF weight sub-register banks, $w_0$ 1703 and $w_1$ 1704, in accordance with the MF constraint criterion.

With switch S2 1713 closed the adjustment signal derived from the MF constraint error is passed to algorithm optional ALG-6 1727 to control the rate at which the contents of equalizer FF weight sub-register banks $w_0$ 1703 and $w_1$ 1704 are to be updated in accordance with the MF constraint criterion. FIG. 8 illustrates a detailed block diagram of ALG-6 1722 in accordance with a preferred embodiment of the present invention as previously described and discussed.

Continuing with the process description of FIG. 17, after passing through ALG-6 1727 the adjustment signal associated with the constraint error, and derived from ALG-5 1726, is delivered to algorithm ALG-2 1722, as in previous embodiments, which performs an update of the contents of the both the equalizer FF weight sub-register banks $w_0$ 1703 and $w_1$ 1704 in accordance with the MF constraint criterion. Switch S15 1715 is then opened.

This completes the MF portion of the joint ISI-cancelling and MF operation at the current iteration for the polyphase embodiment of the present invention.

Commutator COM_1 1707 then moves back to the $u_1$ register bank 1702, COM_2 1716 moves back to data sub-register bank $u_1$ 1702 and constraint sub-register bank $c_1$ 1706, and COM_3 1717 moves back to the equalizer FF weight sub-register bank $w_1$ 1704, all movements again controlled by the clock 1718. Also the contents of delay register 1711 and delay register 1714 are zeroed out.

The entire process is repeated with the contents equalizer data sub-register bank $u_1$ 1702 shifted to the right by one position to prepare for the next sample of distorted input waveform to be delivered to the first register position of $u_1$ 1702.

With respect to the configuration of ALG-ISI-ERR 1720 in the polyphase embodiment, FIGS. 9–11 illustrate detailed block diagrams of ALG-ISI-ERR 1720 in accordance with preferred embodiments of the present invention as previously described and discussed.

When ALG-ISI-ERR 1720 in the polyphase embodiment is defined as in FIG. 10, where a slicer forms the equalization error, a DF configuration can be used to enhance the cancellation of ISI. FIG. 12 illustrates a detailed block diagram of the DF configuration in accordance with a preferred embodiment of the present invention as previously described and discussed.

The polyphase embodiment of the present invention also benefits from initialization of the equalizer's FF weights using ALG-7 1730. FIG. 15 illustrates a detailed block diagram of ALG-7 1730 in accordance with a preferred embodiment of the present invention. Since the constraint register bank 510 (ref. FIG. 15) is partitioned into sub-register banks $c_0$ 1705 and $c_1$ 1706 in the polyphase embodiment, ALG-7 1730 initializes sub-register banks $c_0$ 1705 and $c_1$ 1706 with the odd and even indexed RRC MF taps, respectively, or vice versa.

Although the present invention and its advantages have been described in detail, it should be understood that various changes, substitutions and alterations can be made herein without departing from the spirit and scope of the invention as defined by the appended claims.

What is claimed is:

1. A fractional-spaced digital equalizer comprising:
   a bank of register delay elements representing a data register bank that stores samples of an input distorted waveform;
   a switch (S1) to control a portion of a joint intersymbol interference (ISI)-canceling and matched filter (MF) equalizer update associated with an intersymbol interference (ISI)-cancellation process;
   a bank of register elements representing equalizer feed-forward (FF) weight register bank that stores equalizer (FF) weights coefficient values;
   a bank of multiplier elements used in forming inner products associated with both the (ISI)-cancellation and (MF) constraint updates;
   a bank of summing nodes used in forming inner products associated with both the (ISI)-cancellation and (MF) constraint updates;
   an (M: 1) commutation device to perform decimation to the symbol rate;
   an algorithm to form the error sequence associated with (ISI) cancellation;
   an algorithm to convert an (ISI) cancellation error signal into an adjustment signal needed to control an equalizer (FF) weight update in accordance with a criterion for (ISI) cancellation;
   an algorithm to update the contents of the equalizer (FF) weight register bank in accordance with first, the criterion for (ISI)-cancellation, and second, a (MF) constraint criterion;
   a bank of register elements representing the constraint register bank to store samples of the constraint waveform;
   an algorithm that generates samples of the constraint waveform;
   the constraint waveform used in forming the inner product associated with the (MF) constraint processing;
   a switch (S2) to control that portion of the joint (ISI)-canceling and (MF) equalizer update associated with the (MF) constraint process;
   a parameter ($\beta$) representing the constraint level of the (MF) constraint update;
   a differencing node to subtract the orthogonality measure from the constraint level in order to form the constraint error; and
   an algorithm to convert the constraint error signal into an adjustment signal needed to control the equalizer (FF) weight update in accordance with the (MF) constraint criterion.

2. The fractional-spaced equalizer as set forth in claim 1 wherein said equalizer operates at M-samples-per-symbol where M>1 and satisfies the Nyquist Criterion.

3. The fractional-spaced equalizer as set forth in claim 2 wherein said sampling factor M is equal to 2.

4. The fractional-spaced equalizer as set forth in claim 1 wherein said equalizer operates as a complex equalizer comprising complex operations.

5. The fractional-spaced equalizer as set forth in claim 1 wherein said equalizer operates as a real equalizer comprising real operations.

6. The fractional-spaced equalizer as set forth in claim 1 wherein the signal occurring prior to said M-to-1 decimator is passed directly to switch S2, instead of passing through said M-to-1 commutator, so that constraint processing can be performed using every fractional-spaced sample of the distorted input waveform.

7. The fractional-spaced equalizer as set forth in claim 1 wherein said algorithm that computes the error associated with ISI-cancellation is based upon a training sequence update and comprises:
   a training sequence of distortion-less data; and
   a differencing node to form the difference between the equalized decimated signal and the training sequence.

8. The fractional-spaced equalizer as set forth in claim 1 wherein said algorithm that computes the error associated with (ISI)-cancellation is based upon a decision-directed update and comprises:
   a slicer device to quantizes samples of equalized decimated signal; and
   a differencing node to form the difference between pre-slicer sequence and post-slicer sequence.

9. The fractional-spaced equalizer as set forth in claim 1 wherein said algorithm that computes the error associated with (ISI) cancellation is based upon a blind constant modulus algorithm (CMA) update and comprises:
   an algorithm to form the statistical parameter ($R_m$) measuring the ratio o(f moments of the pre-pulse shaped modulation amplitudes; a switch (S7) to eliminate the computation of ($R_m$) from the processing so that parameter ($R_m$) is computed only one time;
   a register element to store the value of parameter ($R_m$);
   a complex conjugation operator to conjugate the sample input to the (CMA);
   a multiplier element to obtain the product between the input sample and its complex conjugate;
   a differencing node to form the difference between parameter ($R_m$) and the absolute value of the input sample squared; and
   a multiplier element to obtain the product of (1) the difference between parameter ($R_m$) and the absolute value of the input sample squared and (2) the input sample.

10. The fractional-spaced equalizer as set forth in claim 9 wherein said algorithm forming the value ($R_m$) comprises:

an absolute value operator to perform an absolute value of the input modulated 2-tuple;

a divide operation to form the value of ($R_m$);

a switch (S8) to control when the numerator portion of a ratio is to be delivered to the divide operation to form the value of parameter ($R_m$);

a switch (S9) to control when the denominator portion of a ratio is to be delivered to the divide operation to form the value of parameter ($R_m$);

a counter to control when switches (S8) and (S9) are closed to form the value of parameter ($R_m$);

a summing node used in the ratio's numerator accumulation process;

a summing node used in the ratio's denominator accumulation process;

a register element used in the ratio's numerator accumulation process;

a register element used in the ratio's denominator accumulation process;

a squaring operator;

a operator to perform a power operation to the m-th power; and a parameter (m) representing the statistical moment of the (CMA) update satisfies the condition m>0.

11. The fractional-spaced equalizer as set forth in claim 1 wherein said algorithm converting the (ISI) cancellation error signal into an adjustment signal comprises:

a complex conjugation operator to perform a complex conjugation of the samples of input error sequence;

a parameter ($\mu$) to control the adaptation rate of the equalizer's weight in accordance with the criterion for (ISI) cancellation; and a multiplier element to form the product of the conjugated error sequence and parameter ($\mu$).

12. The fractional-spaced equalizer as set forth in claim 11 wherein the value for said scalar ($\mu$) is in the range $0<\mu>\mu_{crit}$ and $\mu_{crit}$ is inversely proportional to the power level of the samples residing in the equalizer data register bank.

13. The fractional-spaced equalizer as set forth in claim 1 wherein said algorithm driving the equalizer weight update comprises:

a bank of multiplier elements to scale each element in the data register bank with a sample of the (ISI) cancellation adjustment signal; and a bank of summing nodes to form the addition of the said bank of products with the current contents of the equalizer weight register bank.

14. The fractional-spaced equalizer as set forth in claim 1 wherein constraint waveform is defined to be a high frequency signal.

15. The fractional-spaced equalizer as set forth in claim 14 wherein said high frequency signal representing said constraint waveform is sinusoidal in nature.

16. The fractional-spaced equalizer as set forth in claim 15 wherein said high frequency sinusoid signal is a complex sinusoid of the form A exp{j $2\pi f\ kT_s+\phi$}.

17. The fractional-spaced equalizer as set forth in claim 16 wherein said frequency (f) is a time variable frequency.

18. The fractional-spaced equalizer as set forth in claim 17 wherein minimum and maximum values of said time-variable frequency are selected to develop a robust out-of-band spectral mask for the (FSE) that is comparable to that of a (MF).

19. The fractional-spaced equalizer as set forth in claim 16 wherein said amplitude (A) is an amplitude fixed to a singular value and satisfies |A|>0.

20. The fractional-spaced equalizer as set forth in claim 16 wherein said amplitude (A) is a time variable amplitude ($A_s$) and satisfies |A|>0.

21. The fractional-spaced equalizer as set forth in claim 16 wherein said phase ($\phi$) is a phase fixed to a singular value and satisfies $\{0\leq\phi<2\pi\}$.

22. The fractional-spaced equalizer as set forth in claim 16 wherein said phase ($\phi$) is a time variable phase and satisfies $\{0\leq\phi<2\pi\}$.

23. The fractional-spaced equalizer as set forth in claim 15 wherein said high frequency sinusoid signal is a real sinusoid, either of the form A sin{$2\pi f\ kT_s+\phi$} or A cos{$2\pi f\ kT_s+\phi$}.

24. The fractional-spaced equalizer as set forth in claim 23 wherein said frequency (f) of said sinusoid is a time variable frequency.

25. The fractional-spaced equalizer as set forth in claim 24 wherein minimum and maximum values of said time-variable frequency (f) are selected to develop a robust out-of-band spectral mask for the (FSE) that is comparable to that of a (MF).

26. The fractional-spaced equalizer as set forth in claim 23 wherein said amplitude (A) is an amplitude fixed to a singular value and satisfies |A|>0.

27. The fractional-spaced equalizer as set forth in claim 23 wherein said amplitude (A) is a time variable amplitude ($A_s$) and satisfies |A|>0.

28. The fractional-spaced equalizer as set forth in claim 23 wherein said phase ($\phi$) is a phase fixed to a singular value and satisfies $\{0\leq\phi<2\pi\}$.

29. The fractional-spaced equalizer as set forth in claim 23 wherein said phase ($\phi$) is a time variable phase and satisfies $\{0\leq\phi<2\pi\}$.

30. The fractional-spaced equalizer as set forth in claim 1 wherein said algorithm generating said constraint waveform comprises:

an overflow counter to generate an integer (i) that indexes a frequency register bank;

a frequency register bank storing the independent frequencies of the sinusoidal signal representing the constraint waveform;

a scalar set to value of 1.0;

a register that stores the state of the incremental count of the overflow counter;

an overflow test to compare the value in the register with a parameter representing a maximum count value;

a parameter (N) representing the number of independent constraint frequencies;

a summing node to increment the count of the overflow counter; and a quadrature oscillator that generates samples of the sinusoidal signal representing the constraint waveform from the frequencies in the frequency register bank.

31. The fractional-spaced equalizer as set for in claim 1 wherein samples of said constraint waveform are loaded into the constraint register bank via (ROM) lookup table.

32. The fractional-spaced equalizer as set forth in claim 1 wherein value of said constraint level parameter ($\beta$) resides in the range $\{0\leq\beta<1\}$.

33. The fractional-spaced equalizer as set forth in claim 1 wherein said differencing node forming constraint error is eliminated from the architecture of the present invention when parameter ($\beta$) is set to 0.

34. The fractional-spaced equalizer as set forth in claim 1 wherein said (MF) error adjustment algorithm comprises:

a complex conjugation operator to perform a complex conjugation of the samples of input MF constraint error;

a parameter (α) to control the adaptation rate of the equalizer's weight in accordance with the (MF) constraint criterion; and a multiplier element to form the product of the complex conjugate (MF) constraint error and parameter (α).

35. The fractional-spaced equalizer as set forth in claim 34 wherein the value for a scalar (α) satisfies α>0.

36. The fractional-spaced equalizer as set forth in claim 34 wherein the value for said scalar (a) is equal to A/L commensurate with the constraint waveform defined as a sinusoidal signal of amplitude (A) and length (L).

37. The fractional-spaced equalizer as set forth in claim 1 where a fractional-spaced equalizer further comprises an algorithm that modifies the constraint waveform via time domain windowing.

38. The fractional-spaced equalizer as set forth in claim 36 wherein said algorithm that modifies the constraint waveform via time domain windowing does so with a single window function.

39. The fractional-spaced equalizer as set forth in claim 38 wherein said algorithm that modifies the constraint waveform via time domain windowing with a single window function comprises:

a bank of multiplier elements used to multiply each sample of the time series of each constraint sinusoid with a window function;

a set of coefficients representing a window function used to window the samples of the constraint sinusoid; and a bank of register elements to store the set of coefficients representing the window function.

40. The fractional-spaced equalizer as set forth in claim 39 wherein said window function is derived from any function that can modify the time response of the constraint sinusoid through time-domain windowing.

41. The fractional-spaced equalizer as set forth in claim 40 wherein said window function is derived from a rectangular, Bartlett, Blackman, Chebyshev, hamming, harm, Kaiser, or triangular window function.

42. The fractional-spaced equalizer as set forth in claim 37 wherein said algorithm that modifies the constraint waveform via time domain windowing does so with multiple window functions.

43. The fractional-spaced equalizer as set forth in claim 42 wherein said algorithm that modifies the constraint waveform via time domain windowing with multiple window functions comprises:

a register bank to store the samples of the current state of the windowed constraint waveform during the multi-window process;

a switch (S10) to load the pre-windowed constraint waveform into the register bank only one time;

a bank of multiplier elements used to multiply each sample of the time series of each constraint sinusoid with a particular window function of the set of window functions;

a collection of window functions used to window the samples of the constraint sinusoid;

a collection of banks of register elements to store the set of coefficients of the collection of window functions;

a switch (S12) to allow the multiplier bank to access a particular window function of the set of window functions; and a switch (S11) to deliver the windowed constraint waveform to the constraint register bank when the windowing process has been completed.

44. The fractional-spaced equalizer as set forth in claim 43 wherein said window function is derived from a rectangular, Bartlett, Blackman, Chebyshev, hazuming, hann, Kaiser, or triangular window function.

45. The fractional-spaced equalizer as set forth in claim 1 wherein a fractional spaced equalizer further comprises an algorithm that controls the rate at which the contents of the equalizer's (FF) weight register bank are updated in accordance with the (MF) constraint update.

46. The fractional-spaced equalizer as set forth in claim 45 where said algorithm that controls the rate at which the contents of the equalizer's (FF) weight register bank are updated in accordance with the (MF) constraint criterion comprises:

a switch (S3) to control when the algorithm for updating the contents of the equalizer (FF) weight registers is to be engaged;

an overflow counter to control when switch (S3) is to be open and closed;

a scalar set to value of 1.0;

a register that stores the state of the incremental count of the overflow counter;

a summing node to increment the count of the overflow counter;

an overflow test to compare the value in the register with a parameter representing a maximum count value;

a switch (S4) to allow the overflow test to use the value designated by parameter (P0) as the maximum count value;

a switch (S5) to allow the overflow test to use the value designated by parameter (P1) as the maximum count value;

a switch (S6) to allow the overflow test to use the value designated by parameter (P2) as the maximum count value;

a parameter (P0) that represents a maximum count value;

a parameter (P1) that represents a maximum count value; and a parameter (P2) that represents a maximum count value.

47. The fractional-spaced equalizer as set forth in claim 46 wherein said parameter (P0), (P1), and (P2) are integers and satisfy P0>0, P1>0, and P2>0.

48. The fractional-spaced equalizer as set forth in claim 1 wherein a fractional spaced equalizer further comprises an algorithm that initializes the contents of the equalizer's (FF) weight register bank with coefficients of square root raised cosine (RRC) (ME).

49. The fractional-spaced equalizer as set forth in claim 48 where said algorithm that initializes the contents of the equalizer's (FF) weight register bank with coefficients of a (RRC) (MF) comprises:

a selected set of (RRC) (ME) coefficients loaded from (ROM) into the register positions of the equalizer (FF) weight register bank; and a switch (S13) to shutoff the initialization after the contents of the equalizer (FF) weight register bank.

50. The fractional-spaced equalizer as set forth in claim 1 wherein a fractional-spaced equalizer further comprises a decision-feedback update.

51. The fractional-spaced equalizer as set forth in claim 50 where said decision-feedback update comprises:

a register delay bank to store past decisions from a slicer device;

a slicer device to quantizes samples of equalized decimated signal;
a register bank representing the decision register bank that stores the values of the weights of a decision-feedback filter;
a bank of multiplier elements used in forming the inner product between the contents of the decision register bank and the decision-feedback weight register bank;
a bank of summing nodes used in forming the inner product between the contents of the decision register bank and the decision-feedback weight register bank;
a single summing node adding the decision register and decision-feedback weight inner product to the output of the M:1 commutator;
a bank of multiplier elements used in updating the contents of the decision-feedback weight register bank;
a bank of summing nodes in updating the contents of the decision-feedback weight register bank.

52. A fractional-spaced digital equalizer comprising:
a set of (M) banks of register delay elements representing data sub-register banks ($u_0, u_1, \ldots u_{(M-1)}$) that store samples of the input distorted waveform which are commutated to data subregister banks ($u_0, u_1, \ldots, u_{(M-1)}$);
a set of (M) banks of register elements representing an equalizer (FF) weight subregister banks ($w_0, w_1, \ldots, w_{(M-1)}$) that store the values of the equalizer's (FF) weights, with each bank storing a different subset of the total weight set;
a set of (M) banks of register elements representing constraint sub register banks ($c_0, c_1, c_{(M-1)}$) that store samples of a constraint waveform;
an algorithm that generates samples of the constraint waveform;
the constraint waveform used in forming the inner product associated with the (MF) constraint processing;
a commutator (COM 1) which delivers samples of the input distorted waveform to be equalized to data sub-register banks ($u_0, u_1, \ldots u_{(M-1)}$);
a switch (S1) to control a portion of a joint (ISI)-canceling and (MF) equalizer update associated with the (ISI)-cancellation process;
a bank of multiplier elements used in forming inner products associated with both the (ISI)-cancellation and (MF) constraint updates;
a bank of summing nodes used in forming inner products associated with both the (ISI)-cancellation and (MF) constraint updates;
a single register delay element to store inner products associated with the formation of the equalized signal;
a switch (S14) to control when an error sequence associated with (ISI)-cancellation is to be developed;
a switch (S2) to control a portion of the time-multiplexing process associated with the (MF) constraint update;
a single register delay element to store an inner product computation associated with a (MF) constraint process;
a switch (S15) to control when a (MF) constraint error is to be developed;
a commutator (COM 2) which controls which pair of sub-register banks, either $\{u_0, c_0\}$ or $\{u_1, c_1\}$ or $\{u_{(M-1)}, c_{(M-1)}\}$, are to access the multiplier bank at the current (COM 1) position;
a commutator (COM 3) which controls which equalizer (FF) weight sub-register bank, either ($w_0$ or $w_1$ or $w_{(M-1)}$) is to access the multiplier bank at the current (COM 1) position;
a clock to control an adjustment of (COM 1), (COM 2), and (COM 3);
a summing node to add the two inner product sums which form the equalized signal;
an algorithm to form the error sequence associated with (ISI) cancellation;
an algorithm to convert the (ISI) cancellation error signal into an adjustment signal needed to control an equalizer (FF) weight update in accordance with a criterion for (ISI) cancellation;
an algorithm to update the contents of the equalizer (FF) weight sub-register banks $\{w_0, w_1, \ldots, w_{(M-1)}\}$ in accordance with first, the criterion for (ISI) cancellation, and second, an (MF) constraint criterion;
a summing node to add the two inner product sums which form a measure of orthogonality between the equalizer's weights and constraint;
a parameter ($\beta$) representing a constraint level of the (MF) processing;
a differencing node needed to subtract the orthogonality measure from the constraint level in order to form the constraint error;
an algorithm to convert the constraint error signal into an adjustment signal needed to control the equalizer FF weight update in accordance with the (MF) constraint criterion.

53. The fractional-spaced equalizer as set forth in claim 52 wherein a poly-phase configured equalizer accommodates an input signal sampled at (M)-samples-per-symbol by using (M) data sub-register banks, (M) constraint register sub-banks, and (M) equalizer (FF) weight register banks.

54. The fractional-spaced equalizer as set forth in claim 53 wherein said sampling factor (M) is equal to 2.

55. The fractional-spaced equalizer as set forth in claim 52 wherein said equalizer operates as a complex equalizer comprising complex operations.

56. The fractional-spaced equalizer as set forth in claim 52 wherein said equalizer operates as a real equalizer comprising real operations.

57. The fractional-spaced equalizer as set forth in claim 52 wherein said algorithm that computes the error associated with (ISI) cancellation is based upon a training sequence update and comprises:
a training sequence of distortion-less data; and
a differencing node to form the difference between the equalized decimated signal and the training sequence.

58. The fractional-spaced equalizer as set forth in claim 52 wherein said algorithm that computes the error associated with (ISI) cancellation is based upon a decision-directed update and comprises:
a slicer device to quantizes samples of equalized decimated signal; and
a differencing node to form the difference between pre-slicer sequence and post-slicer sequence.

59. The fractional-spaced equalizer as set forth in claim 52 wherein said algorithm that computes the error associated with (ISI) cancellation is based upon a blind (CMA) update and comprises:
an algorithm to form the statistical parameter ($R_m$) measuring the ratio of moments of the pre-pulse shaped modulation amplitudes;
a switch (S7) to eliminate the computation of ($R_m$) from the processing so that parameter ($R_m$) is computed only one time;
a register element to store the value of parameter ($R_m$);
a complex conjugation operator to conjugate the sample input to the (CMA);

a multiplier element to obtain the product between the input sample and its complex conjugate;

a differencing node to form the difference between parameter ($R_m$) and the absolute value of the input sample squared; and a multiplier element to obtain the product of (1) the difference between parameter ($R_m$) and the absolute value of the input sample squared and (2) the input sample.

60. The fractional-spaced equalizer as set forth in claim 59 wherein said algorithm forming the value ($R_m$) comprises:

an absolute value operator to perform an absolute value of the input modulated 2-tuple;

a divide operation to form the value of ($R_m$);

a switch (S8) to control when the numerator portion of a ratio is to be delivered to the divide operation to form the value of parameter ($R_m$);

a switch (S9) to control when the denominator portion of a ratio is to be delivered to the divide operation to form the value of parameter ($R_m$);

a counter to control when switches (S8) and (S9) are closed to form the value of parameter ($R_m$);

a summing node used in the ratio's numerator accumulation process;

a summing node used in the ratio's denominator accumulation process;

a register element used in the ratio's numerator accumulation process;

a register element used in the ratio's denominator accumulation process;

a squaring operator;

an operator to perform a power operation to the (m-th) power; and a parameter (m) representing the statistical moment of the (CMA) update satisfies the condition (m)>0.

61. The fractional-spaced equalizer as set forth in claim 53 wherein said algorithm converting the (ISI) cancellation error signal into an adjustment signal comprises:

a complex conjugation operator to perform a complex conjugation of the samples of input error sequence;

a parameter ($\mu$) to control the adaptation rate of the equalizer's weight in accordance with the criterion for (ISI) cancellation; and a multiplier element to form the product of the conjugated error sequence and parameter ($\mu$).

62. The fractional-spaced equalizer as set forth in claim 61 wherein the value for said parameter ($\mu$) is in the range $0<(\mu<\mu_{crit})$ and ($\mu_{crit}$) is inversely proportional to the power level of the samples of distorted waveform residing in the equalizer data register bank.

63. The fractional-spaced equalizer as set forth in claim 52 wherein said algorithm driving the equalizer weight update comprises:

a bank of multiplier elements to scale each element in the data register bank with a sample of the (ISI) cancellation adjustment signal; and a bank of summing nodes to form the addition of the said bank of products with the current contents of the equalizer weight register bank.

64. The fractional-spaced equalizer as set forth in claim 52 wherein constraint waveform is defined to be a high frequency signal.

65. The fractional-spaced equalizer as set forth in claim 64 wherein said high frequency signal representing said constraint waveform is sinusoidal in nature.

66. The fractional-spaced equalizer as set forth in claim 65 wherein said high frequency sinusoid signal is a complex sinusoid of the form $A \exp\{j\ 2\pi f\ kT_s+\phi\}$.

67. The fractional-spaced equalizer as set forth in claim 66 wherein said frequency (f) is a time variable frequency.

68. The fractional-spaced equalizer as set forth in claim 67 wherein minimum and maximum values of said time-variable frequency are selected to develop a robust out-of-band spectral mask for the (FSE) that is comparable to that of a (MF).

69. The fractional-spaced equalizer as set forth in claim 66 wherein said amplitude (A) is an amplitude fixed to a singular value and satisfies |A|>0.

70. The fractional-spaced equalizer as set forth in claim 66 wherein said amplitude (A) is a time variable amplitude and satisfies |A|>0.

71. The fractional-spaced equalizer as set forth in claim 66 wherein said phase ($\phi$) is a phase fixed to a singular value and satisfies $\{0 \leq \phi < 2\pi\}$.

72. The fractional-spaced equalizer as set forth in claim 66 wherein said phase ($\phi$) is a time variable phase and satisfies $\{0 \leq \phi < 2\pi\}$.

73. The fractional-spaced equalizer as set forth in claim 65 wherein said high frequency sinusoid signal is a real sinusoid, either of the form $A \sin\{2\pi f\ kT_s+\phi\}$ or $A \cos\{2\pi f\ kT_s+\phi\}$.

74. The fractional-spaced equalizer as set forth in claim 73 wherein said frequency (f) of said sinusoid is a time variable frequency.

75. The fractional-spaced equalizer as set forth in claim 74 wherein minimum and maximum values of said time-variable frequency are selected to develop a robust out-of-band spectral mask for the (FSE) that is comparable to that of a MF.

76. The fractional-spaced equalizer as set forth in claim 73 wherein said amplitude (A) is an amplitude fixed to a singular value and satisfies |A|>0.

77. The fractional-spaced equalizer as set forth in claim 73 wherein said amplitude (A) is a time variable amplitude and satisfies |A|>0.

78. The fractional-spaced equalizer as set forth in claim 73 wherein said phase ($\phi$) is a phase fixed to a singular value and satisfies $\{0 \leq \phi < 2\pi\}$.

79. The fractional-spaced equalizer as set forth in claim 73 wherein said phase ($\phi_s$) is a time variable phase and satisfies $\{0 \leq \phi < 2\pi\}$.

80. The fractional-spaced equalizer as set forth in claim 52 wherein a sinusoid representing said constraint waveform is generated via an algorithm comprising of:

an overflow counter to generate an integer (i) that indexes a frequency register bank;

a frequency register bank storing the independent frequencies of the sinusoidal signal representing the constraint waveform;

a scalar set to value of 1.0;

a register that stores the state of the incremental count of the overflow counter;

an overflow test to compare the value in the register with a parameter representing a maximum count value;

a parameter (N) representing the number of independent constraint frequencies;

a summing node to increment the count of the overflow counter; and a quadrature oscillator that generates samples of the sinusoidal signal representing the constraint waveform from the frequencies in the frequency register bank.

81. The fractional-spaced equalizer as set forth in claim 52 wherein samples of a sinusoidal constraint waveform are loaded into the constraint register bank via ROM lookup table.

82. The fractional-spaced equalizer as set forth in claim 52 wherein value of said constraint level parameter ($\beta$) resides in the range $\{0 \leq \beta < 1\}$.

83. The fractional-spaced equalizer as set forth in claim 52 wherein said differencing node forming constraint error is eliminated from the architecture of the present invention when a parameter ($\beta$) is set to 0.

84. The fractional-spaced equalizer as set forth in claim 52 wherein said (MF) error adjustment algorithm comprises:
   a complex conjugation operator to perform a complex conjugation of the samples of input (MF) constraint error;
   a parameter ($\alpha$) to control the adaptation rate of the equalizer's weight in accordance with the (MF) constraint criterion; and
   a multiplier element to form the product of the complex conjugate (MF) constraint error and parameter ($\alpha$).

85. The fractional-spaced equalizer as set forth in claim 84 wherein the value for a scalar ($\alpha$) satisfies $\alpha > 0$.

86. The fractional-spaced equalizer as set forth in claim 85 wherein the value for said scalar ($\alpha$) is equal to (A/L) commensurate with the constraint waveform defined as a sinusoidal signal of amplitude (A) and length (L).

87. The fractional-spaced equalizer as set forth in claim 52 wherein a fractional-spaced equalizer further comprises an algorithm that modifies the constraint waveform via time-domain windowing.

88. The fractional-spaced equalizer as set forth in claim 87 wherein said algorithm that modifies the constraint waveform via time-domain windowing does so with a single window function.

89. The fractional-spaced equalizer as set forth in claim 88 wherein said algorithm that modifies the constraint waveform via time domain windowing with a single window function comprises:
   a bank of multiplier elements used to multiply each sample of the time series of each constraint sinusoid with a window function; and
   a set of coefficients representing a window function used to window the samples of the constraint sinusoid; and
   a bank of register elements to store the set of coefficients representing the window function.

90. The fractional-spaced equalizer as set forth in claim 89 wherein said window function is derived from any function that can modify the time response of the constraint sinusoid through time-domain windowing.

91. The fractional-spaced equalizer as set forth in claim 90 wherein said window function is derived from a rectangular, Bartlett, Blackman, Chebyshev, hamming, hann, Kaiser, or triangular window function.

92. The fractional-spaced equalizer as set forth in claim 87 wherein said algorithm that modifies the constraint waveform via time domain windowing does so with multiple window functions.

93. The fractional-spaced equalizer as set forth in claim 92 wherein said an algorithm that modifies the constraint waveform via time domain windowing with multiple window functions comprises:
   a register bank to store the samples of the current state of the windowed constraint waveform during the multi-window process;
   a switch (S10) to load the pre-windowed constraint waveform into the register bank only one time;
   a bank of multiplier elements used to multiply each sample of the time series of each constraint sinusoid with a particular window function of the set of window functions;
   a collection of window functions used to window the samples of the constraint sinusoid;
   a collection of banks of register elements to store the set of coefficients of the collection of window functions;
   a switch (S12) to allow the multiplier bank to access a particular window function of the set of window functions; and
   a switch (S11) to deliver the windowed constraint waveform to the constraint register bank when the windowing process has been completed.

94. The fractional-spaced equalizer as set forth in claim 93 wherein said window function is derived from a rectangular, Bartlett, Blackman, Chebyshev, hamming, hann, Kaiser, or triangular window function.

95. The fractional-spaced equalizer as set forth in claim 52 wherein a fractional spaced equalizer further comprises an algorithm that controls the rate at which the contents of the equalizer's (FF) weight register bank are updated in accordance with the (MF) constraint update.

96. The fractional-spaced equalizer as set forth in claim 95 where said algorithm that controls the rate at which the contents of the equalizer's (FF) weight register bank are updated in accordance with the (MF) constraint update comprises:
   a switch (S3) to control when the algorithm for updating the contents of the equalizer (FF) weight registers is to be engaged;
   an overflow counter to control when switch (S3) is to be open and closed;
   a scalar set to value of 1.0;
   a register that stores the state of the incremental count of the overflow counter;
   a summing node to increment the count of the overflow counter;
   an overflow test to compare the value in the register with a parameter representing a maximum count value;
   a switch (S4) to allow the overflow test to use the value designated by parameter (P0) as the maximum count value;
   a switch (S5) to allow the overflow test to use the value designated by parameter (P1) as the maximum count value;
   a switch (S6) to allow the overflow test to use the value designated by parameter (P2) as the maximum count value;
   a parameter (P0) that represents a maximum count value;
   a parameter (P1) that represents a maximum count value; and
   a parameter (P2) that represents a maximum count value.

97. The fractional-spaced equalizer as set forth in claim 96 wherein said parameters (P0), (P1), and (P2) are integers and satisfy (P0)>0, (P1)>0, and (P2)>0.

98. The fractional-spaced equalizer as set forth in claim 52 wherein a fractional spaced equalizer further comprises an algorithm that initializes the contents of the equalizer's (FF) weight register bank with coefficients of (RRC) (MF).

99. The fractional-spaced equalizer as set forth in claim 98 where said algorithm that initializes the contents of the equalizer's (FF) weight register bank with coefficients of a (RRC) (MF) comprises:

a selected set of (RRC) (MF) coefficients loaded from (ROM) into the register positions of the equalizer (FF) weight register bank; and a switch (S13) to shutoff the initialization after the contents of the equalizer FF weight register bank.

100. The fractional-spaced equalizer as set forth in claim 52 wherein a fractional-spaced equalizer further comprises a decision-feedback update.

101. The fractional-spaced equalizer as set forth in claim 100 where said decision-feedback update comprises:

a register delay bank to store past decisions from a slicer device;

a slicer device to quantizes samples of equalized decimated signal;

a register bank representing the decision register bank that stores the values of the weights of a decision-feedback filter;

a bank of multiplier elements used in forming the inner product between the contents of the decision register bank and the decision-feedback weight register bank;

a bank of summing nodes used in forming the inner product between the contents of the decision register bank and the decision-feedback weight register bank;

a single summing node adding the decision register and decision-feedback weight inner product to the output of the 2:1 commutator;

a bank of multiplier elements used in updating the contents of the decision-feedback weight register bank; and a bank of summing nodes in updating the contents of the decision-feedback weight register bank.

* * * * *